United States Patent [19]

Fagen et al.

[11] Patent Number: 6,108,689

[45] Date of Patent: *Aug. 22, 2000

[54] METHOD AND SYSTEM FOR PROCESSING MESSAGES IN A DISTRIBUTED COMPUTING ENVIRONMENT

[75] Inventors: Scott Andrew Fagen, Poughkeepsie; Richard Charles Williams, New Paltz, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,527

[22] Filed: Oct. 11, 1996

[51] Int. Cl.$^7$ .................................................... G06F 15/16
[52] U.S. Cl. ............................................ 709/206; 709/245
[58] Field of Search ........................ 395/200.36, 200.37, 395/200.66, 684, 200.67, 200.43; 709/206, 207, 213, 237, 236, 304, 245

[56] References Cited

U.S. PATENT DOCUMENTS

| | | | |
|---|---|---|---|
| 4,766,534 | 8/1988 | DeBenedictis | 364/200 |
| 4,807,118 | 2/1989 | Lin et al. | 364/200 |
| 4,807,224 | 2/1989 | Naron et al. | 370/94 |
| 5,047,925 | 9/1991 | Kun et al. | 364/200 |
| 5,167,035 | 11/1992 | Mann et al. | 395/575 |
| 5,212,778 | 5/1993 | Dally et al. | 395/400 |
| 5,230,051 | 7/1993 | Quan | 395/700 |
| 5,237,571 | 8/1993 | Cotton et al. | 370/110.1 |
| 5,243,596 | 9/1993 | Port et al. | 370/94.1 |
| 5,278,955 | 1/1994 | Forte et al. | 395/200.36 |
| 5,301,186 | 4/1994 | Galuszka et al. | 370/24 |
| 5,347,450 | 9/1994 | Nugent | 395/200 |
| 5,355,371 | 10/1994 | Auerbach et al. | 370/60 |
| 5,404,461 | 4/1995 | Olnowich et al. | 395/325 |
| 5,404,501 | 4/1995 | Carr et al. | 395/575 |
| 5,408,646 | 4/1995 | Olnowich et al. | 395/575 |
| 5,425,021 | 6/1995 | Derby et al. | 370/54 |
| 5,507,031 | 4/1996 | Nakamura | 395/800 |
| 5,634,127 | 5/1997 | Cloud et al. | 395/680 |
| 5,701,427 | 12/1997 | Lathrop | 395/200.01 |
| 5,913,032 | 6/1999 | Schwartz et al. | 395/200.43 |

FOREIGN PATENT DOCUMENTS

365745-A2   5/1990   European Pat. Off. ........ G06F 15/16

*Primary Examiner*—Glenton B. Burgess
*Assistant Examiner*—Kenneth W Fields
*Attorney, Agent, or Firm*—Lawrence D. Cutter, Esq.; Heslin & Rothenberg, P.C.

[57] ABSTRACT

A message processing facility provides a send function for sending messages to designated locations. The facility allows a default target for a message, initiates parallel execution, adds additional processes to an already parallel execution, determines that a problem has completed and performs the appropriate completion actions. The message processing facility enables coordination of the results of a network that has been widened in its parallelism, without creating subproblems. Processes within the parallel network do not need to be aware of the topology or the position of a given process within the topology. The width of the parallelism involved in a particular request is tracked, and therefore, the appropriate number of results expected can be determined automatically and dynamically. Therefore, despite dynamic changes in topology, completion can be determined without awareness of the processes that create the results.

9 Claims, 21 Drawing Sheets

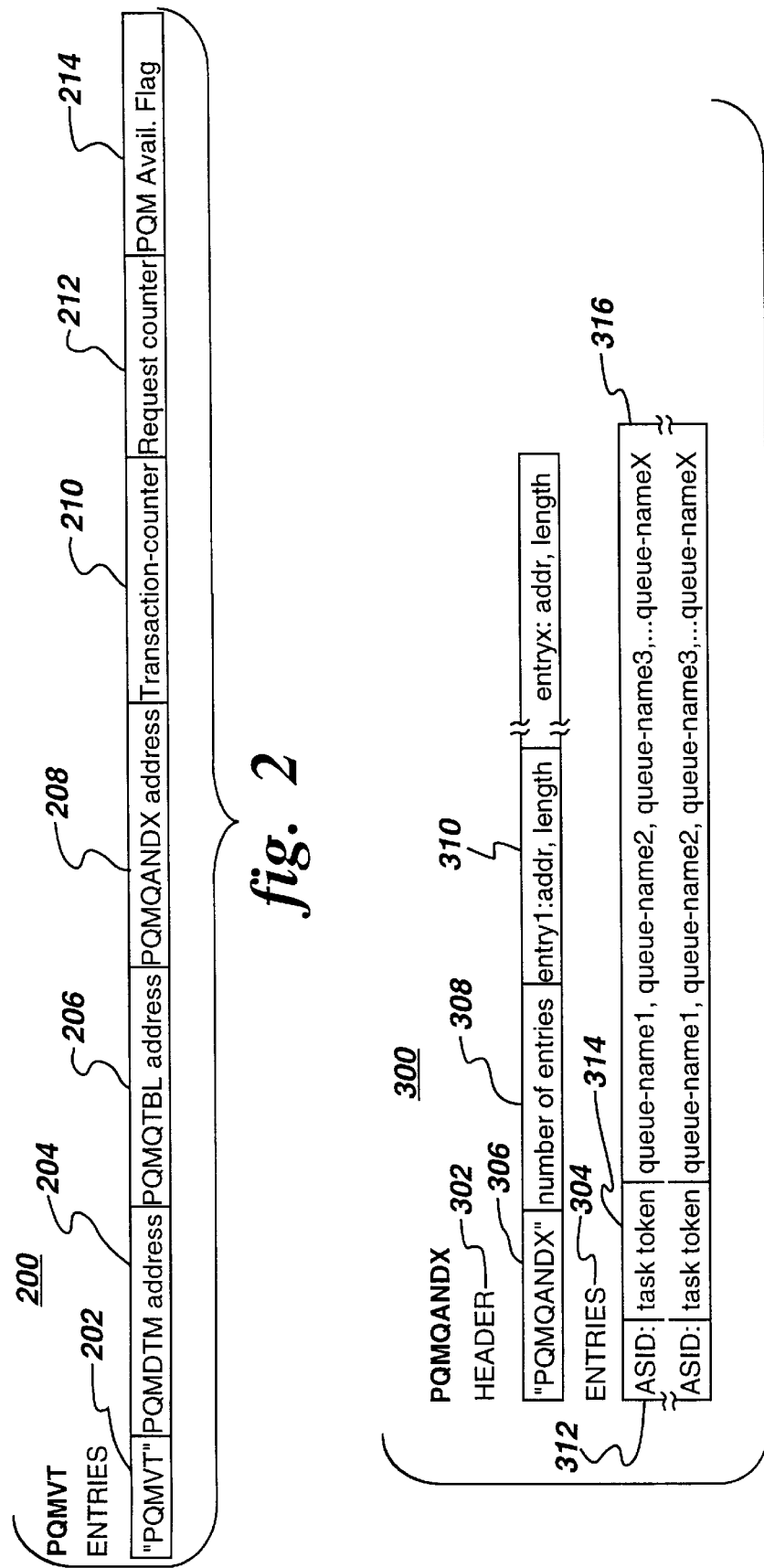

6,108,689

METHOD AND SYSTEM FOR PROCESSING MESSAGES IN A DISTRIBUTED COMPUTING ENVIRONMENT

TECHNICAL FIELD

This invention relates, in general, to distributed computing environments, and in particular, to a message processing facility within a distributed computing environment, which enables parallel processing of messages used in providing a solution for a request.

BACKGROUND ART

Message passing is used for the solution of parallel programming problems or requests. In this use, a network of processes use such a message passing system to communicate to solve the problem.

In the current technology of messaging and parallel development support, there is one technique for coordinating such parallel processing topologies, called "scripting." This technique is provided by Workflow products.

Scripting provides a technique for describing the topology and conditions for completion to solve a particular problem or flow of work. The script is interpreted and each step may initiate a flow of messages to a set of target tasks (or processes) in the next step of the topology. The script ends with the description of the conditions for completion. In this way, scripting describes one and only one static topology for the solution of a given problem. Though awareness of the topology is not required in each of the tasks, none of the tasks can conditionally change the topology. This means that variations of a given script must be created for these conditions, and the conditions must be determined prior to execution so that the proper script for this unique problem can be chosen. This can require considerable effort that in many cases would have been best done when the task encounters the condition during execution.

There are also a number of roll your own techniques, which are described below. In general, these techniques are designed for single stage parallelism and predetermined topologies. These techniques provide complicated and easily broken methods for determining the completion of parallel tasks. Using current message passing systems, much of the awareness of the network topology is "hardcoded" in the tasks. Changes to the topology require changes to the underlying tasks. The current technology is:

1. To create a set of slots which accommodates the predetermined number of expected results for the topology. Each task would place its result in a predetermined slot. This design requires that only one set of results can be collected for one problem. Otherwise, the result of a subsequent problem might end up filling up or overwriting a slot for the prior problem. In this methodology, the originating tasks would have to coordinate the initiation of the next problem with the completion of the current problem. This technique is called "cycling."
2. To reproduce the entire network of processes and queues for each request. In this methodology, each problem has its own tasks, queues and slots. This solution limits the number of concurrent problems that can be worked on because the system must replicate the storage available for all the problems and queues used to solve each instance of the problem.
3. To place all results in one queue. The initiating process identifies each new problem that it starts and passes that identifier with the message to all of the parallel processes. Each result is stored in the next available slot, not a predetermined slot. A completion checking task looks through all of the collected results for all of the problems in process and counts the number of results for a given problem. When a specified number of results are found for that problem, it is considered complete. Some task is then notified to take the results off the queue and process them. Clearly, this solution has efficiency and resource problems. This solution has some obvious contention problems and possible resource problems. If a change is made to the number of results expected for a given problem, it is now impossible to alter the topology dynamically, as an alteration would affect problems of this type that are currently "in flight." The completion checking routine would have to distinguish between results from problems initiated before and after the alteration.

This problem is usually solved by deferring the initiation of all new problems of this type until the last in flight problem completes, then one informing the completion task of the change in the number of expected results for this problem. Then, new problems of the given type can be initiated and results checked. This is called "cycling the network."

Based on the foregoing, a need exists for an improved message processing facility that allows for the widening of parallel execution of messages. Further, a need exists for a facility that can coordinate the results of a network of processes that has been widened in its parallelism without creating subproblems. Additionally, a need exists for a facility that enables a message to know what request it pertains to and where in the processing sequence of that request it belongs.

SUMMARY OF THE INVENTION

The shortcomings of the prior art are overcome and additional advantages are provided through the provision of a message processing facility.

In one embodiment, a method for processing messages in a computer system is provided. A message is sent to a location designated to receive the message. The message includes a request identifier, specifying a request the message corresponds to, and a sequence identifier, indicating where in a processing sequence of the request a message belongs. The message is then retrieved from the location.

In a further embodiment of the invention, a send function is used to send the message to the location. The send function includes a parameter indicating whether the message corresponds to the request or to another request.

In a further embodiment of the invention, the message is retrieved by a process and the process then sends the message to one or more other processes, which are dynamically determined by the process.

In a further aspect of the invention, a system for processing messages in a computer system is provided. The system includes means for sending a message to a location designated to receive the message and means for retrieving the message from the location. The message includes a request identifier, specifying a request the message corresponds to, and a sequence identifier, indicating where in a processing sequence of the request the message belongs.

The method and system of the present invention advantageously saves storage, processing power and simplifies the programmer effort. It provides high level services that allow the creation of parallel networks of processes without requiring process awareness of the topology or the position a given process may have in the topology. Processes or networks need not be cycled or stopped. Because the message carries an identifier of the request it is a part of and its unique location, the nexus for the request it is a result for can be determined automatically. The width of the parallelism involved in a particular request is tracked, and therefore, the appropriate number of results expected can be determined automatically and dynamically. Therefore, despite dynamic changes in topology, completion can be determined without awareness of the processes that create the results.

Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 2 depicts one example of a vector table used in accordance with the principles of the present invention;

FIG. 3 depicts one example of an index table used in accordance with the principles of the present invention;

BEST MODE FOR CARRYING OUT THE INVENTION

Figure 1:
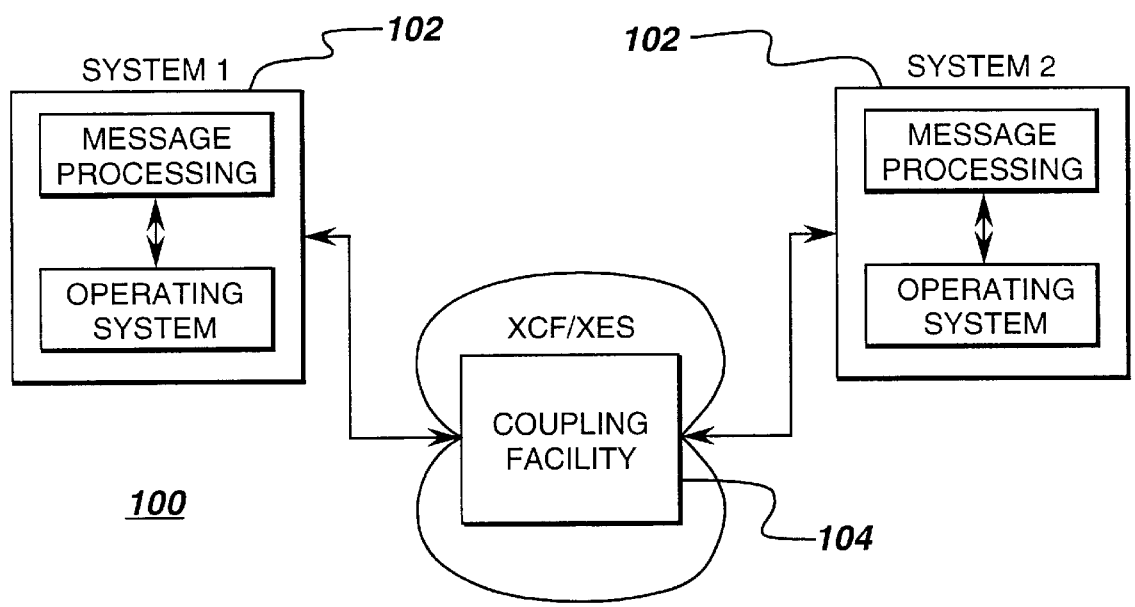
FIG. 1 depicts one example of a sysplex incorporating and using the principles of the present invention.

In accordance with the principles of the present invention, a mechanism for processing messages in a computer system is provided. A message is placed on (or sent to) a queue. Messages are taken off a queue by processes that are designed to read these queues, process the message and send the message to another queue or to multiple queues. When a message is sent to multiple queues or "fanned out", the receiving processes may each receive and separately and simultaneously do work on a part of the results for a given problem. Such a multiple send initiates a transaction and the original transaction is called a request. Each message carries, for example, a triplet of a request identifier, a transaction identifier and a parallelism width identifier, called a limb number, as well as the application data. A process receiving one of these messages may do some processing and modify the application data in the message. The process can then send its result on to another queue or declare that the transaction limb is complete.

In a further embodiment of the invention, an extendible structure is established to collect the results from all of the completed limbs of a transaction. This structure is called the "nexus". When all the results are collected in the nexus from all the limbs in the transaction, that transaction is considered complete. The nexus also keeps information about the transaction including the number of limbs in the process.

In a further aspect of the invention, a process on a limb of a transaction may receive a message and process the message using parallel processes. To do this, the process can create a new transaction (also called a subtransaction). The nexus for this subtransaction records the information necessary to collect the results of the subtransaction and properly restore the triplet so that the result of the subtransaction can be treated as the limb that created it and be collected in the nexus of the next outermost transaction. This technique is called nesting transactions.

In a further embodiment of the invention, it is also possible for a process to add more limbs to the transaction it is a part of, rather than nest transactions. A transaction containing a process that does this is called an eccentric transaction. The invention allows the number of limbs to be added to the eccentric transaction to be determined by the process at execution time. For this, the nexus for the eccentric transaction can be altered to handle more limbs. Each message on the new limbs receives, for example, the appropriate triplet to uniquely identify its place in the transaction. Completion of the transactions waits until all of the results are collected from all of the limbs including the new ones.

In a further aspect of the invention, the collected results are combined into a new message and a triplet is created from the transaction information in the nexus. If the transaction that the nexus served was created as a subtransaction by a limb of another transaction (called the next outermost transaction), then a triplet is formed which identifies this new message as being that limb and a part of the next outermost transaction and request.

FIG. 1 depicts one example of a computing environment 100 incorporating and using the message processing facility of the present invention. In one example, computing environment 100 includes a plurality of computing systems 102 and a coupling facility 104, each of which is described in detail below.

As one example, each computing system 102 is designed following the Enterprise Systems Architecture/390 offered by International Business Machines Corporation, as described in Enterprise Systems Architecture/390 Principles of Operation, IBM Publication No. SA22-7201-02 (December 1994), which is hereby incorporated herein by reference in its entirety. As shown, each computing system executes at least one operating system, such as, for instance, the Multiple Virtual Storage (MVS) operating system offered by International Business Machines Corporation, which is used to control execution of programs and the processing of data, as is well known. Also, in accordance with the principles of the present invention, each system includes a message processing facility used in the receiving, processing and sending of messages, as described in detail below.

Each of the computing systems is coupled to coupling facility 104 via one or more possible connections, such as Cross-System Extended Services (XES) software. Coupling facility 104 is described in detail in MVS/ESA SYSPLEX Services Guide (IBM Publication No. GC28-1495-02) (June 1995) and MVS/ESA SYSPLEX Services and Reference (IBM Publication No. GC28-1496-02) (June 1995), which are hereby incorporated herein by reference in their entirety. In one embodiment, coupling facility 104 is a structured-external storage processor that enables data and processing facilities to be shared by all of the systems connected to the coupling facility.

The above-described computing environment incorporating and using the message processing facility of the present invention is only one example. The techniques of the present invention can be used with many types of computing environments. For example, the invention can be used within an environment having one system coupled to the coupling facility or many systems coupled thereto. Further, a computing system can execute one or more operating systems different from MVS. Additionally, an external coupling facility other than the one described herein can be used without departing from the spirit of the invention. Additionally, the message processing facility of the present invention can be used in a single system environment that does not have or need a coupling facility. Thus, the techniques of the present invention can be used with a computing environment having a single computing system with one or more operating systems, or a sysplex environment having a plurality of computing systems, or any other type of systems, without departing from the spirit of the present invention.

In accordance with the principles of the present invention, a number of data structures are used in the message processing facility of the present invention. An example of each of these data structures is described in detail below.

One data structure includes a vector table 200 (FIG. 2), referred to herein as PQMVT, which is used in keeping track of some of the other data structures of the present invention.

In one embodiment, there is a vector table on each system wishing to participate in the message processing facility of the present invention and each PQMVT 200 includes the following fields:

(a) An eye catcher field 202 having a value of PQMVT specifying that this is the PQMVT table;

(b) A PQMDTM address 204 indicating the address of a local distribution table, PQMDTM, having one or more distribution entries, as described in detail below;

(c) A PQMQTBL address 206 indicating the address of a local queue table, PQMQTBL, having one or more queue entries, as described in detail below;

(d) A PQMQANDX address 208 indicating the address of an queue index table, PQMQANDX, which includes a list of the queues open for each process of each address space of the computing environment, as described in further detail below;

(e) A transaction-counter 210 representing a count of the number of transactions started on the system;

(f) A request-counter 212 representing a count of the number of requests issued on the system; and (g) A PQM available flag 214 indicating whether the message processing facility of the present invention is available on the system.

Another data structure used in accordance with the principles of the present invention is PQMQANDX 300 (FIG. 3). PQMQANDX is an index identifying which queues are open for which processes executing in which address spaces of the computing environment. This data structure is primarily used during the clean-up phase of the invention and includes, for example, a header 302 and one or more entries 304, each of which is described in detail below.

In one embodiment, header 302 includes the following fields:

(a) An eye catcher field 306 indicating this is PQM-QANDX;

(b) A number of entries field 308 representing how many entries are included in entries 304, described below; and (c) An address and length designation 310 for each entry of PQMQANDX.

In addition to the above, each entry 304 of PQMQANDX 300 includes, for example:

(a) An address space identifier (ASID) 312 specifying an identifier of the user's address space having a connection to one or more queues specified in the entry, as described below;

(b) A task token 314 specifying the process within the user's address space that has a connection to the one or more queues specified in the entry; and (c) One or more queue names 316 that are open for the ASID/task token indicated in the entry.

Another data structure used in accordance with the principles of the present invention includes a distribution table, which represents a directory of all of the possible destinations for messages. A destination may be a queue name or a list of queues names. In accordance with the present invention, the distribution table includes one or more distribution list names, each of which includes one or more queue names, as described below. One example of a distribution table, PQMDTM, is described in detail below.

Figure 4A:
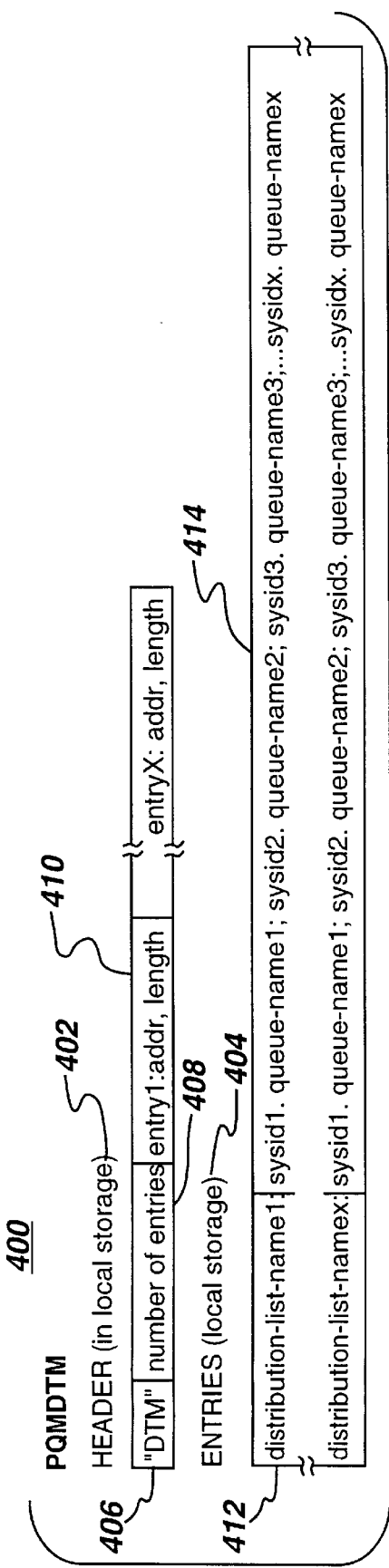
FIGS. 4a–4b depict examples of a distribution table used in accordance with the principles of the present invention.

In one embodiment, PQMDTM 400 (FIG. 4a) includes a header 402 and one or more entries 404, each of which is described in detail below.

As one example, header 402 of PQMDTM 400 includes the following fields:

(a) An eye catcher 406 identifying this table as PQM-DTM;

(b) A number of entries field 408 indicating a count of the number of entries in entries 404; and (c) An address and length designation 410 for each of the entries.

Each of entries 404 includes, for instance:

(a) A distribution list name 412 indicating the name of the distribution list; and (b) A list of queue names 414 representing all of the queues represented by the associated distribution list name.

Figure 4B:
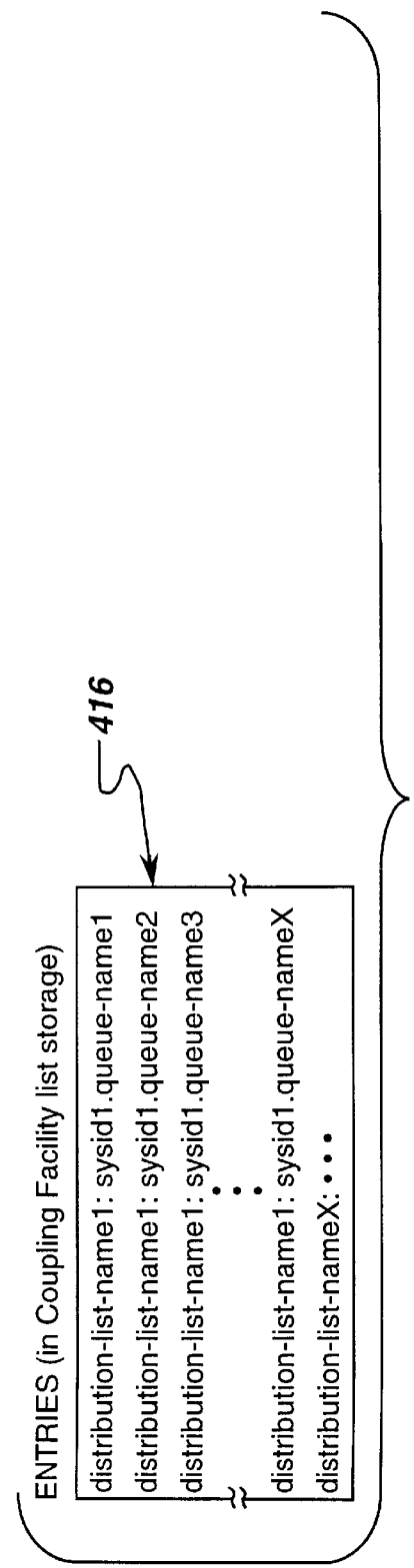
Figure 5:
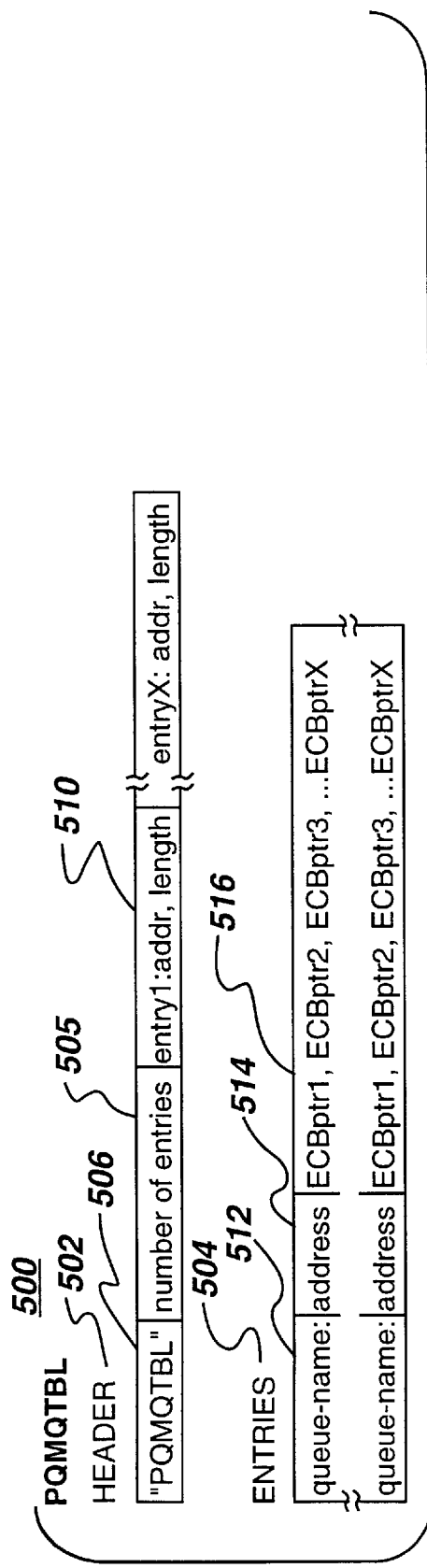
FIG. 5 depicts one example of a queue table used in accordance with the principles of the present invention.

The above-described PQMDTM is located in local storage on each of the systems executing the message processing facility of the present invention. However, in addition to the local copies, PQMDTM is stored in the coupling facility in a list structure 416, as shown in FIG. 4b. By definition, PQMDTM list structure 416 is accessible by each of the systems coupled to the coupling facility. List structures are described in detail in MVS/ESA SYSPLEX Services Guide and MVS/ESA SYSPLEX Services and Reference, each of which is hereby incorporated herein by reference in its entirety.

In addition to the above-described data structures, another data structure, referred to as PQMQTBL, is used, in accordance with the principles of the present invention to identify the queues designated for the local system. Each of the queues is capable of receiving messages, which can later be retrieved for processing. Each system participating in the message processing facility of the present invention has its own PQMQTBL. In one embodiment, PQMQTBL 500 includes a header 502 and one or more entries 504, each of which is described in detail below.

In one example, header 502 includes the following fields:

(a) An eye catcher 506 designating this table as PQM-QTBL;

(b) A number of entries field 508 indicating how many entries are included in entries 504; and (c) An address and length designation 510 for each entry of the queue table, PQMQTBL.

Additionally, each entry of PQMQTBL includes, for example:

(a) A queue name 512 identifying the queue;

(b) An address 514 specifying where the queue identified by queue name 512 is located in storage; and (c) An Event Control Block (ECB) chain 516 indicating pointers to the ECBs waiting for this queue.

Figure 6:
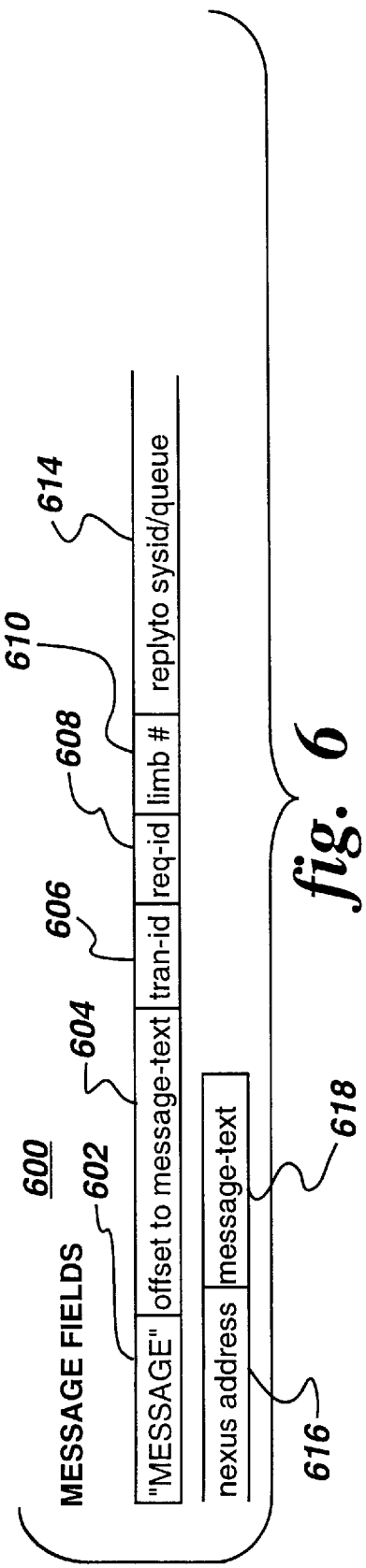
FIG. 6 depicts one example of the fields associated with a message sent and received, in accordance with the principles of the present invention.

Messages are stored in and retrieved from queues, as described in detail herein. Each message 600 (FIG. 6) includes a number of fields, each of which is described in detail below:

(a) An eye catcher 602 indicating that this is a message;

(b) An offset to message-text 604 indicating where in storage the text of the message is located;

(c) A tran-id 606, which is a unique identifier, identifying a transaction. Tran-id 606 gets assigned whenever a transaction is started;

(d) A req-id 608 identifying the request for which the transaction is being processed. A request may, in accordance with the principles of the present invention, have one or more transactions associated therewith;

(e) A limb # 610 identifying the number of limbs within the nexus that the message is associated with, as described in detail below;

(f) A replyto sysid/queue 614 indicating the name of the queue to receive the results of processing this limb;

(g) A nexus address 616 specifying an address of a nexus data structure (described below) associated with the transaction id specified in the message; and (h) A message-text 618 indicating the text of the message to be processed, as described in further detail below.

All of the message fields, except for the message text, are collectively referred to herein as message header 620. In accordance with the principles of the present invention, the message header is not completed by the user but filled in during the processing of the present invention. The message header includes the context of the message processing, and thus, the values of the fields of the message header are carried forward from a received message to messages that the receiving process sends in the present invention.

Figure 7:
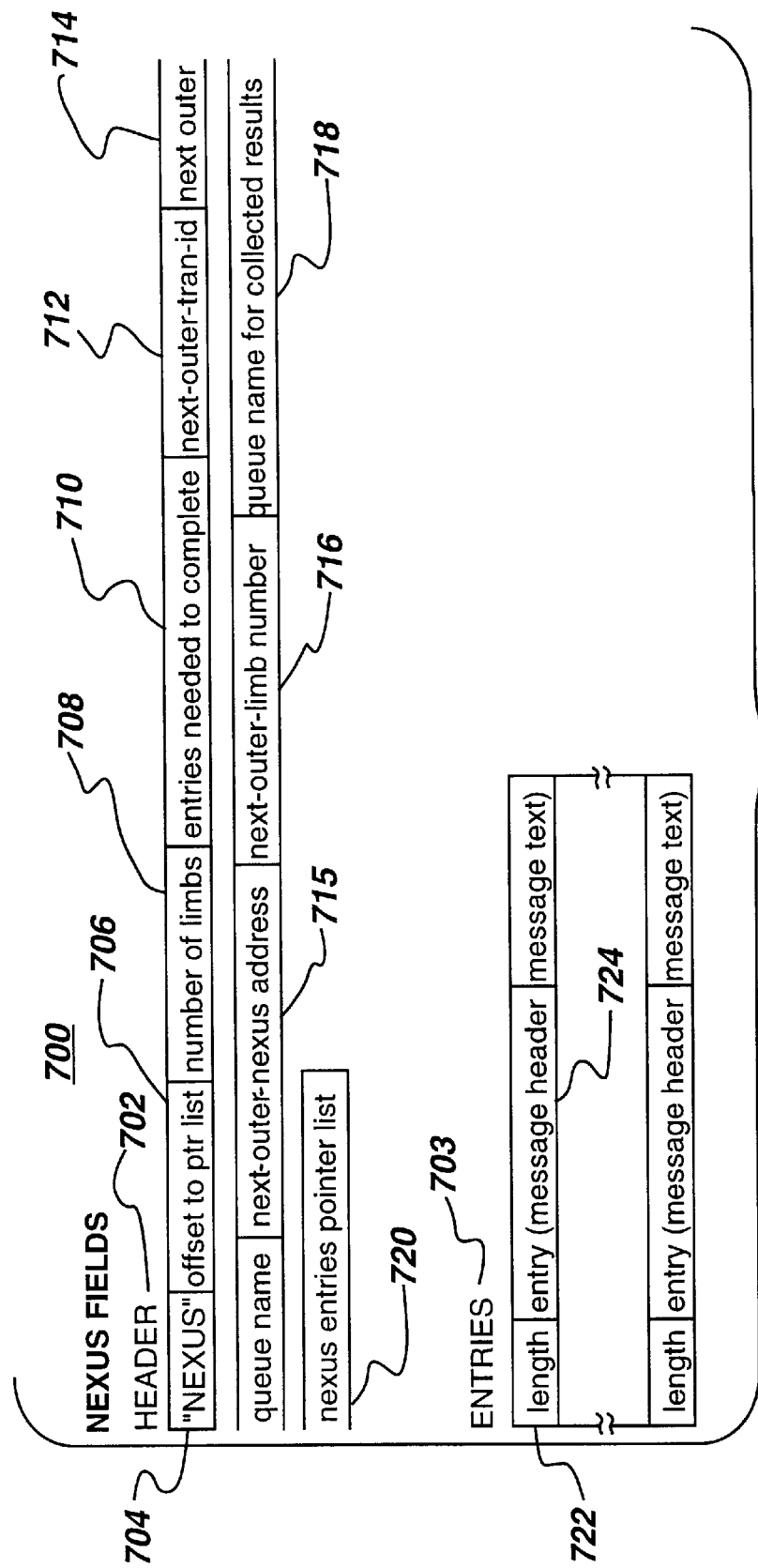
FIG. 7 depicts one example of the fields associated with a nexus table used in accordance with the principles of the present invention.

In addition to the data structures described above, another data structure referred to as a nexus data structure is used, in accordance with the principles of the present invention, to manage nested transactions (a fan-out) of one request. In one embodiment, a nexus data structure 700 (FIG. 7) is created each time a new transaction is started and each nexus data structure includes, for instance, a header 702 and one or more nexus entries 703, each of which is described in detail below.

In one example, header 702 of nexus 700 includes the following fields:

(a) An eye catcher field 704 indicating that this is a nexus data structure;

(b) An offset to pointer (ptr) list 706 indicating an offset to the nexus entries pointer list field 720 (described below) located within the nexus header;

(c) A number of limbs field 708 specifying the number of limbs included in the transaction specified by tran-id 606 (FIG. 6), as described in further detail below;

(d) An entries needed to complete field 710 indicating the number of entries needed to complete the processing of the transaction represented by tran-id 606;

(e) A next-outer-tran-id field 712 specifying the transaction being processed when the transaction represented by tran-id was created. This shows a nesting of transactions and enables the process to get back to the previous transaction;

(f) A next outer queue name 714 indicating the queue that is associated with the transaction identified in the next-outer-tran-id field;

(g) A next-outer-nexus address 715 indicating the nexus address for the nexus of the next outermost transaction;

(h) A next-outer-limb number 716 specifying the limb of the transaction in process when this new transaction created this nexus;

(i) A queue name for collected results field 718 indicating the target queue for the results of the transaction when the transaction is complete; and (j) A nexus entries pointer list 720 specifying the address of the entries list of the nexus data structure.

Additionally, each of nexus entries 703 includes, in one example, the following fields:

(a) A length field 722 indicating the length of the entry; and (b) An entry 724 including the message header and message text that will hold the final message (the result) from this limb of the transaction.

In accordance with the principles of the present invention, in one embodiment, prior to a process being able to deliver or receive any messages, the message processing facility of the present invention is enabled. In particular, in one example, a started task, referred to as PQM, is started on each of the computing systems wishing to participate in the message processing facility. For instance, an operator of the system, or a hot list, is used to start PQM. The hot list can automatically start PQM at prespecified times. PQM enables messages to be forwarded and received, in accordance with the present invention, by initializing certain fields used by the invention and setting up the environment, as described below. In one example, PQM includes job control language (JCL) used in executing an initialization routine, referred to as PQMINIT. The parameters for PQMINIT include, for instance, VT indicating in megabytes (MB) the size of the vector table and VERS indicating a two digit version suffix for parmlib members, used in the manner described below.

Figure 8A:
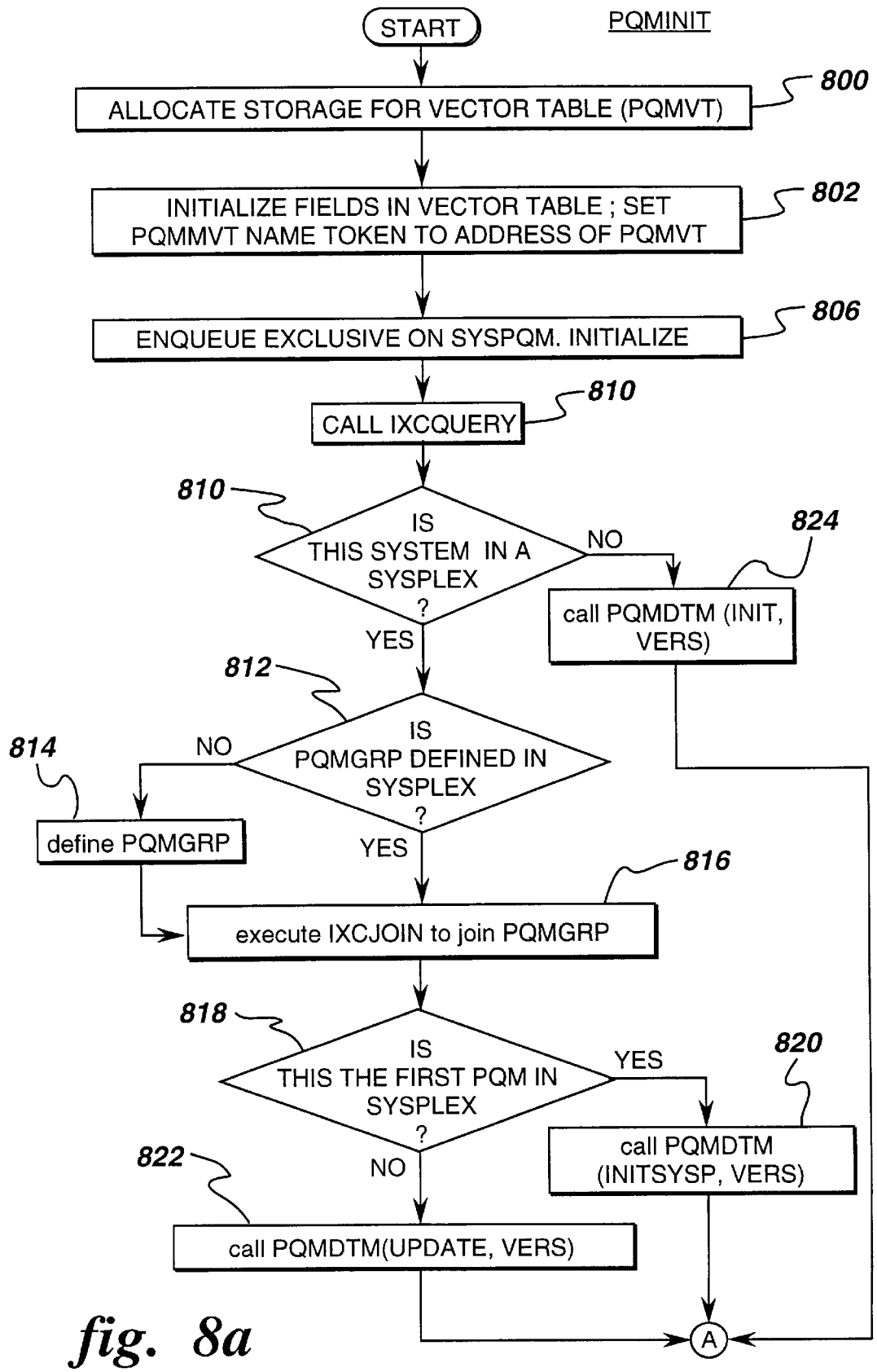
FIGS. 8a–8b depict one embodiment of the logic associated with initializing the message processing mechanism of the present invention.

One embodiment of the logic associated with PQMINIT is described below with reference to FIGS. 8a–8b. Initially, common storage is allocated on the system executing PQMINIT for the vector table, PQMVT (200), STEP 800. The amount of storage allocated is based on the VT parameter passed with PQMINIT. Additionally, the fields of the vector table are initialized to their default values (e.g. zero), and a name token, PQMMVT, is created and set to the address of PQMVT 200, STEP 802. The name token, PQMMVT, can be used by any task in the system to locate the vector table. Thereafter, an exclusive enqueue is taken on the initialization routine by enqueuing on a resource name, referred to as SYSPQM.INITIALIZE, STEP 806. The exclusive enqueue enables the process performing the initialize routine to complete it without concern of another process also entering the routine and possibly corrupting tables used during that routine, such as PQMDTM.

Subsequent to successfully setting the exclusive enqueue, a Call IXCQUERY is performed to receive requested status from the coupling facility, STEP 808. One example of Call IXCQUERY is described in detail in "MVS/ESA: Programming: Sysplex Services Reference MVS/ESA System Product: JES2 Version 5 JES3 Version 5," IBM Publication Number GC28-1496-02, June 1995, which is hereby incorporated herein by reference in its entirety. Call IXCQUERY is used, for instance, to determine if the system running the initialization process is coupled to the coupling facility (i.e., part of a sysplex, where the sysplex has one or more computing systems coupled to the coupling facility), INQUIRY 810. If the system is in the sysplex, then a further determination is made as to whether a group referred to as PQMGRP is defined in the sysplex, INQUIRY 812. PQMGRP is a group of all the computing systems of the sysplex that wish to be a part of managing the messaging processing of the present invention (i.e., the PQM managers). Should the group not be defined indicating that this is the first system to execute PQMINIT, then the group is defined, STEP 814. In one example, the group is created as a list managed by the Cross-System Coupling Facility (XCF). One example of creating groups in a sysplex is described in detail in MVS/ESA SYSPLEX Services Guide and Reference, which are incorporated herein by reference in their entirety, as noted above. Each element of such a group is called a member.

Once the group, PQMGRP, is defined or if it had previously been defined, INQUIRY 812, then the system joins the group by executing an IXCJOIN macro, STEP 816. The IXCJOIN macro places a XCF group (for example, the system) in the active state, associating it with a XCF group, such as PQMGRP. In the active state, the member can use the monitoring and signalling services of XCF. One example of the IXCJOIN macro is described in detail in "MVS/ESA:Programming: Sysplex Services Reference MVS/ESA System Product: JES2 Version 5 JES3 Version 5," IBM Publication Number GC28-1496-02, June 1995, which is hereby incorporated herein by reference in its entirety.

In addition to the above, the joining of the group allows a message exit to be specified, which is used by XCF to send messages to a remote system in accordance with the principles of the present invention, as described in detail herein. In one example, the message exit is referred to herein as PQMXMX, which is described in detail below.

Thereafter, an inquiry is made to determine if this is the first PQM started in the sysplex, INQUIRY 818. In other words, is there just one entry in the PQMGRP. If this is the first entry, then a distribution table manager, referred to as PQMDTM, which is used to establish the local distribution table (DTM) on the system, is called with parameters INITSYSP, and VERS, STEP 820. INITSYSP indicates that the local distribution table is loaded from the parmlib and is copied to the coupling facility; and VERS indicates the two digit version suffix for the parmlib. PQMDTM is described in further detail below.

If, on the other hand, this system is not the first queue manager in the sysplex, then PQMDTM is called with the VERS parameter and an UPDATE parameter indicating the local distribution table is loaded from the coupling facility, STEP 822. Additionally, if the system is not in the sysplex, INQUIRY 810, then PQMDTM is called passing the following parameters: an INIT parameter, indicating that the local distribution table is loaded from the parmlib and kept locally (no copy at the coupling facility), and the VERS parameter, STEP 824.

Figure 8B:
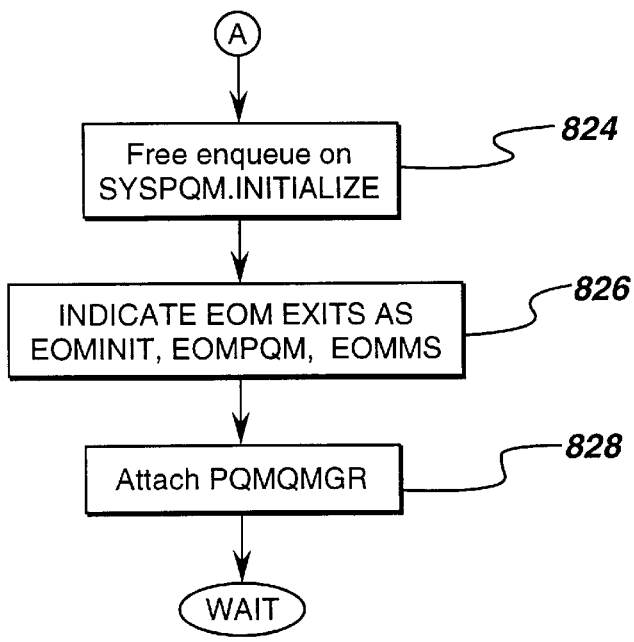

After the local distribution table is loaded in accordance with the parameters passed during the call, the exclusive enqueue on SYSPQM.INITIALIZE is freed, STEP 825 (FIG. 8b). Additionally, an indication is provided that when PQM exits for any reason, several clean-up routines are to be called in the following order: EOMMS, EOMPQM and EOMINIT. Each of the clean-up routines is described below. In addition to indicating the appropriate end of memory (EOM) exits to be used when PQM terminates, PQMQMGR, which is used to manage the queues listed in the queue table, is attached. Thereafter, the initialization procedure is complete.

Figure 9B:
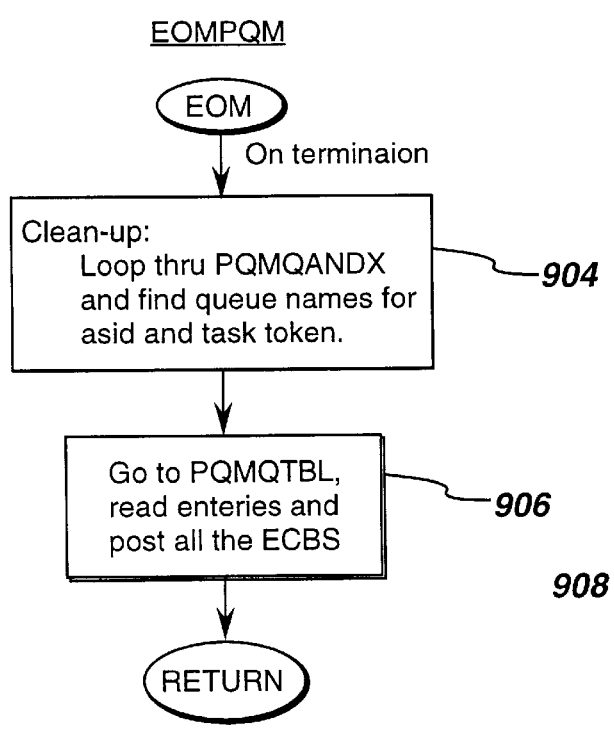
FIGS. 9a–9c depict one embodiment of the logic associated with cleaning-up when PQM is terminated, in accordance with the principles of the present invention.
Figure 9A:
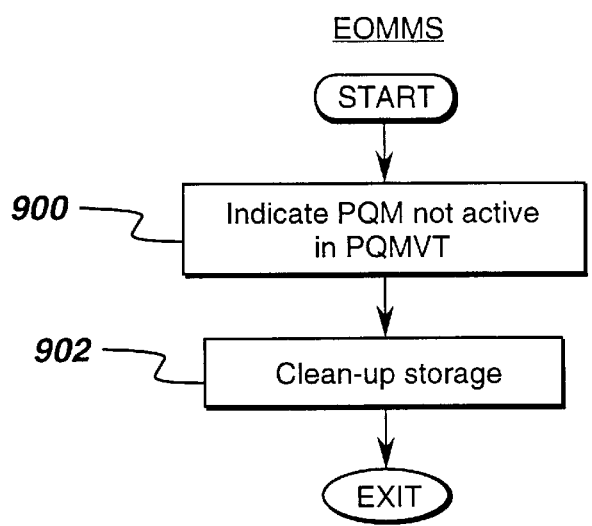

In one embodiment, EOMMS is used to indicate on each system of the computing environment that PQM is no longer active, STEP 900 (FIG. 9a). This is indicated in PQMVT. Additionally, storage for PQM is freed, except for PQMVT.

In addition to EOMMS, the EOMPQM routine is called on termination to post all the ECBs located on the system having the terminated PQM. One example of the logic associated with EOMPQM is depicted in FIG. 9b. Initially, PQMQANDX is looped through to find all of the queue names for the ASID and task token of the terminated PQM, STEP 904. With this information, the entries in PQMQTBL are located and all of the ECBs for the relevant entries are posted, STEP 906. This enables pqmrecv( ), discussed below, to detect that the PQM address space has ended and give a termination return code to the caller.

Figure 9C:
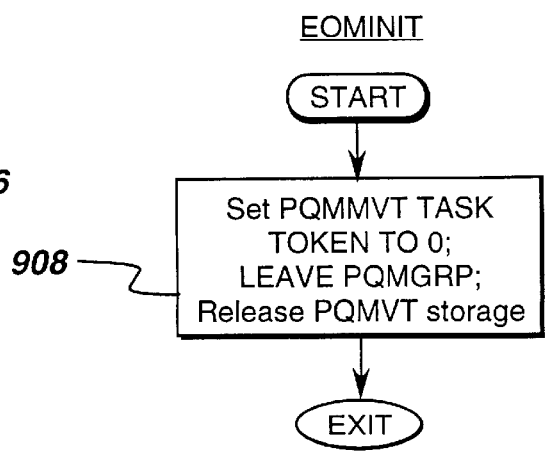

The cleaning up process also includes EOMINIT used to set the PQMMVT name token to zero, to remove the terminated PQM from the PQMGRP, and release storage from PQMVT, STEP 908 (FIG. 9c).

As previously mentioned, during the initialization process, PQMDTM is called in order to load or update the local distribution table. The parameters for PQMDTM include, the function, such as INIT, INITSYSP, or UPDATE;

and VERS, the two-digit version suffix passed from PQMINIT. One example of the logic associated with PQMDTM is described in detail with reference to FIG. 10.

Figure 10:
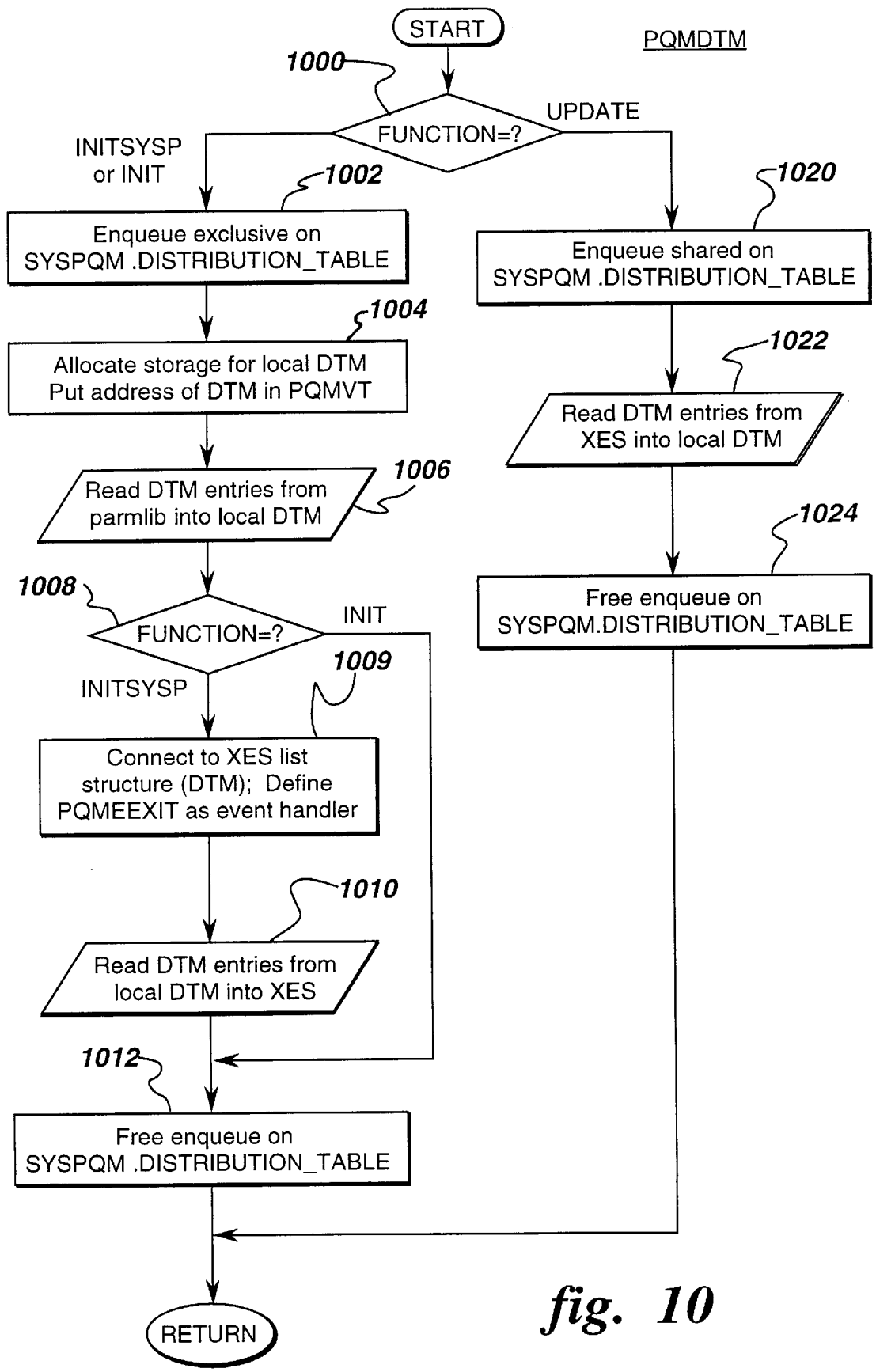
FIG. 10 depicts one embodiment of the logic associated with loading the distribution table of FIGS. 4a–4b, in accordance with the principles of the present invention.

Referring to FIG. 10, initially a determination is made as to whether the function passed as a parameter is equal to INITSYSP, INIT or UPDATE, INQUIRY 1000. If it is equal to INITSYSP or INIT, then an exclusive enqueue is taken on a resource, referred to as SYSPQM.DISTRIBUTION_TABLE, such that the local distribution table and/or the distribution table in the coupling facility can be updated without corrupting either of the tables, STEP 1002. Thereafter, storage is allocated for the local distribution table and the address of the local distribution table is placed in PQMVT 200 at PQMDTM address 204, STEP 1004.

Subsequent to allocating storage for the local distribution table, distribution table entries previously stored in the parmlib having the version number indicated by VERS are read and stored in the local distribution table, STEP 1006. Thereafter, if the function passed in during the call is INITSYSP, INQUIRY 1008, then PQMDTM connects to a XES structure (i.e., the DTM list). Then, the PQMEEXIT is specified as the event handler, STEP 1009. Thereafter, the entries are read from the local distribution table and stored in the distribution table located in the coupling facility, which in one example is a list structure, STEP 1010. This update triggers the event exit PQMEEXIT on other systems in the SYSPLEX. In particular, PQMDTM(UPDATE) is called on those systems. After the storing is complete or if the parameter function is equal to INIT, INQUIRY 1008, then the exclusive enqueue on SYSPQM.DISTRIBUTION_TABLE is freed, STEP 1012 and PQMDTM is complete.

Returning to INQUIRY 1000, if the requested function is UPDATE indicating that the distribution table at the coupling facility has been changed, then the local distribution table is updated from the table in the coupling facility. Therefore, flow passes to STEP 1020 in order to effect this change. In particular, in one example, a shared enqueue is taken on SYSPQM.DISTRIBUTION_TABLE, STEP 1020, and the entries are read from the distribution table in the coupling facility into the local distribution table, STEP 1022. Thereafter, the shared enqueue is freed, STEP 1024, and PQMDTM is complete.

After the distribution tables have been loaded and updated, as requested, then as described above with reference to FIG. 8a, the queue manager, PQMQMGR is started by PQMINIT. In one example, PQMQMGR is initiated via, for example, an MVS ATTACH macro. (One example of the ATTACH macro is described in detail in MVS/ESA Programming: Authorized Assembler Services Reference (ALESERV-DYNALLOC), IBM Publication No. GC28-1475-02, September 1995, which is hereby incorporated herein by reference in its entirety. The ATTACH macro passes the version number, VERS, from PQMINIT, which is used during the processing of PQMQMGR.

Figure 11:
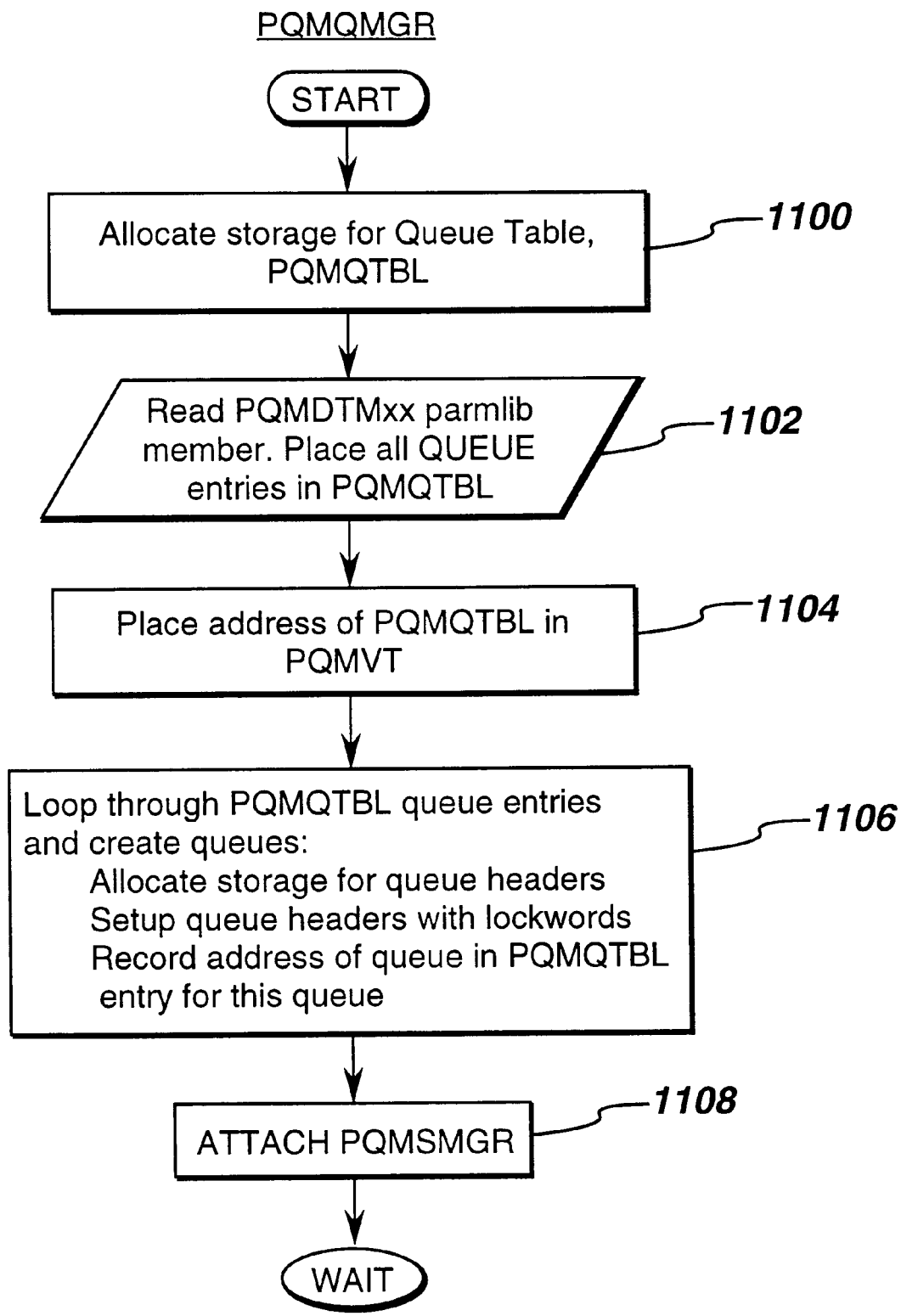
FIG. 11 depicts one embodiment of the logic associated with loading the queue table of FIG. 5, in accordance with the principles of the present invention.

One example of the logic associated with PQMQMGR is described in detail with reference to FIG. 11. Initially, in one embodiment, storage is allocated for the queue table, PQMQTBL, STEP 1100. Thereafter, all of the queue entries are read from the PQMDTMxx (where xx is equal to VERS) parmlib member and placed in the queue table, STEP 1102. Additionally, the address of the queue table is placed in PQMVT 200 at PQMQTBL address 206 to provide addressability for the queue table, STEP 1104.

Figure 12:
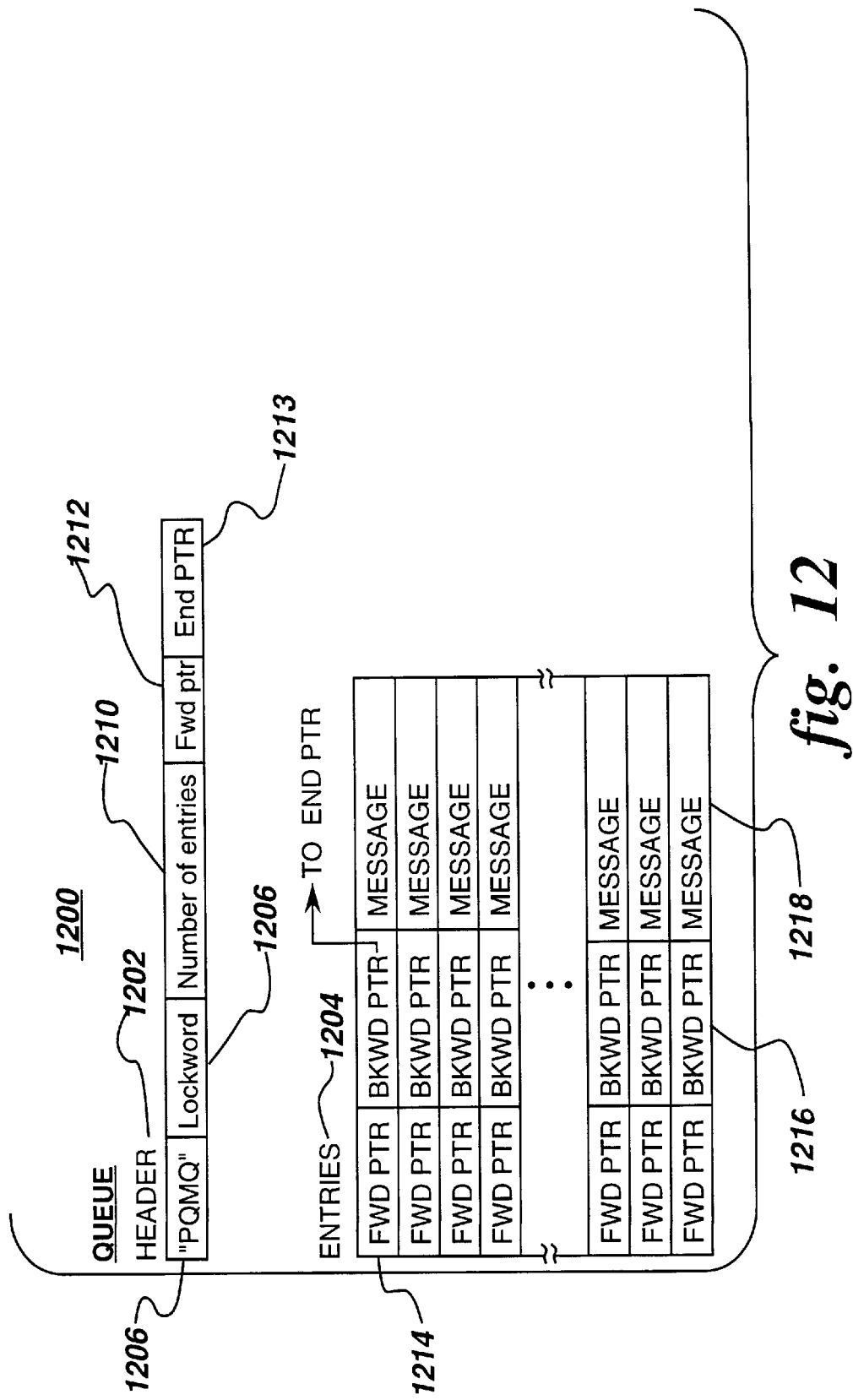
FIG. 12 depicts one example of a queue, in accordance with the principles of the present invention.

Thereafter, a queue is created for each queue entry in PQMQTBL, STEP 1106. In one example, a queue 1200 (FIG. 12) includes a queue header 1202 and one or more queue entries 1204, each of which is described in detail below. Queue header 1202 includes, for instance, the following fields:

(a) An eye catcher 1206 indicating that this is a queue;

(b) A lockword 1208 used in obtaining exclusive access to the queue when needed;

(c) A number of entries field 1210 indicating how many entries the queue contains;

(d) A forward pointer 1212 pointing to the first entry of the queue; and (e) An end pointer 1213 pointing to the last entry of the queue.

Each of entries 1204 includes, for instance, a forward pointer 1214 to the next entry; a backward pointer 1216 to the previous entry; and a message 1218 that has been stored in the queue.

Returning to STEP 1106 (FIG. 11), during creation of each queue, storage for the queue header is allocated, using, for instance, an MVS Storage Macro described in detail in MVS/ESA Programming: Authorized Assembler Services Reference (SETFRRWTOR), IBM Publication No. GC28-1478-01, June 1995, which is incorporated herein by reference in its entirety. Additionally, the address of the queue is recorded in the entry in PQMQTBL for that queue name. The above procedure is repeated for each of the entries in PQMQTBL.

Figure 13:
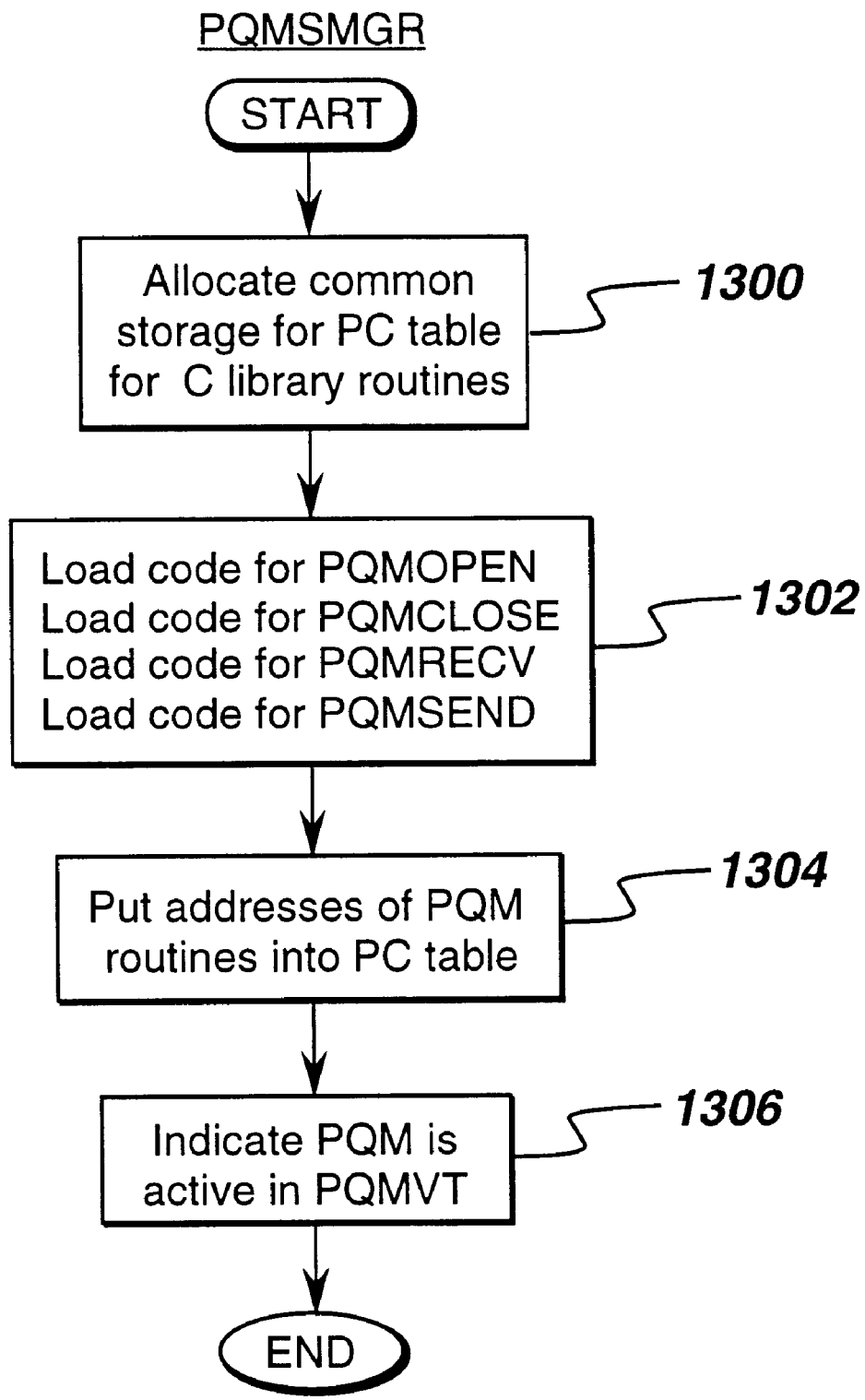
FIG. 13 depicts one example of the logic associated with initializing a number of service tasks to be used by users of the message processing facility of the present invention, in accordance with the principles of the present invention.

Subsequent to creating the queues, a routine referred to as PQMSMGR is started in order to load the code that processes messages using the technique of the present invention, STEP 1108. One example of the logic associated with PQMSMGR is described below with reference to FIG. 13. Initially, common storage is allocated for the PC authorization table used for accessing certain C library routines, described in detail below, STEP 1300 (FIG. 13). Additionally, code is loaded for PQMOPEN used in establishing a connection to specified queues; PQMCLOSE used in disconnecting the established connection; PQMSEND used in sending a message to one or more queues; and PQMRECV used in retrieving a message from the queue, as described in detail below, STEP 1302.

After the code is loaded, the addresses of the loaded code are stored in the PC authorization table, STEP 1304, and PQM is indicated as active in PQMVT, STEP 1306.

Described above in detail is one embodiment for initializing the data structures and managers used in the message processing facility of the present invention. Once the initialization procedures are complete, users can open and close a queue, as well as place messages in and retrieve messages from a queue. In one example, the tasks that enable the above functions are referred to as: PQMOPEN, PQMCLOSE, PQMSEND, and PQMRECV, respectively, each of which is described in detail below.

Figure 14:
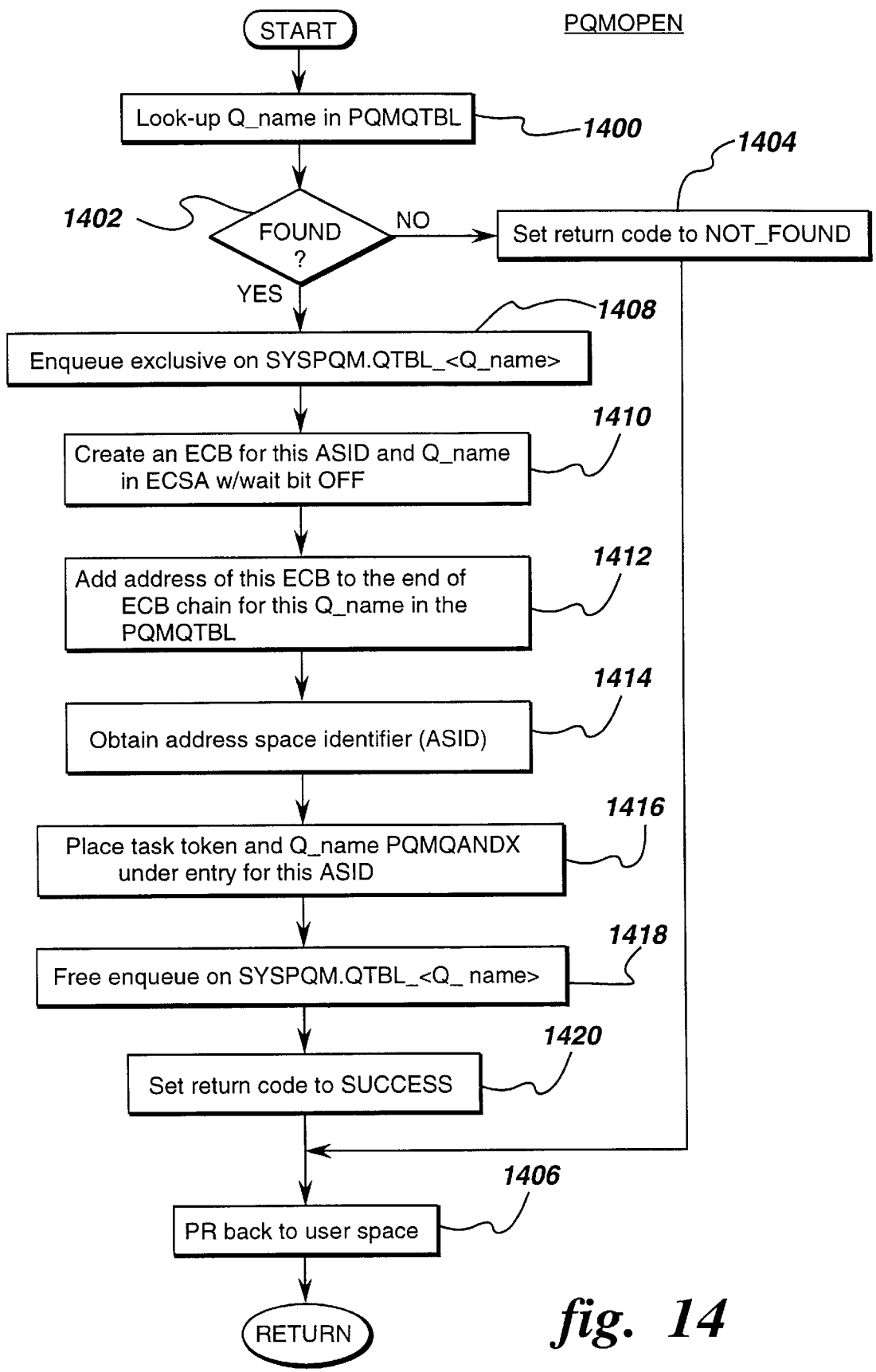
FIG. 14 depicts one embodiment of the logic associated with establishing a connection to a queue for sending to or receiving messages from the queue, in accordance with the principles of the present invention.

PQMOPEN is initiated by, for instance, a Program Call executed within a user process, pqmopen( ). (In one example, pqmopen( ) is a C library routine.) PQMOPEN is used to create a connection between the user process and a queue for the purpose of reading from and writing to the queue. The process pqmopen( ) includes a Q_NAME parameter indicating the queue that the user wishes to connect to. One example of the logic associated with PQMOPEN is described in detail below with reference to FIG. 14.

Initially, the Q_NAME received as a parameter from pqmopen( ) is searched in PQMQTBL 500, STEP 1400. If the requested queue name is not located in the queue table, INQUIRY 1402, then a return code is set to NOT_FOUND, STEP 1404, and a Program Return with the return code is performed from the PQM address space back to the user's address space, STEP 1406. If, on the other hand, the queue name is found in the queue table, INQUIRY 1402, then an exclusive enqueue is taken on the resource name SYSPQM.QTBL_<Q_NAME>, STEP 1408. This enqueue allows an ECB to be created and added to the ECB chain for this queue name without other processes trying to open the same queue at the same time.

Subsequent to obtaining the exclusive enqueue, an ECB is created for the queue name and the address space identifier (ASID) of the address executing this user process, STEP 1410. The ECB is created in extended common storage area (ECSA) and the wait bit of the ECB is OFF. Additionally, the address of this ECB is added to the end of the ECB chain for this queue name in PQMTBL 500, STEP 1412.

Next, the address space identifier and task token for the process issuing the PQMOPEN are obtained, STEP 1414. For example, in order to obtain the ASID, one queries the PSA and locates the ASCB pointer and follows this to the ASID field in the ASCB. This operation is described in the MVS/ESA Data Areas, Vol. I, LY28-1857. Further, to find the "task token," a TCBTOKEN macro is used, which is described in MVS/ESA Programming: Authorized Assembler Services Reference (SETFRR-WTOR), GC28-1478-01, June 1995, which is hereby incorporated herein by reference in its entirety. Then, the address space identifier, task token and queue name are placed in PQMQANDX, STEP 1416. Thereafter, the exclusive enqueue on SYSPQM.QTBL_<Q_NAME> is released, STEP 1418, and the return code is set to SUCCESS, STEP 1420. Subsequently, a Program Return back to the user's address space with the return code is performed, STEP 1406.

Figure 15:
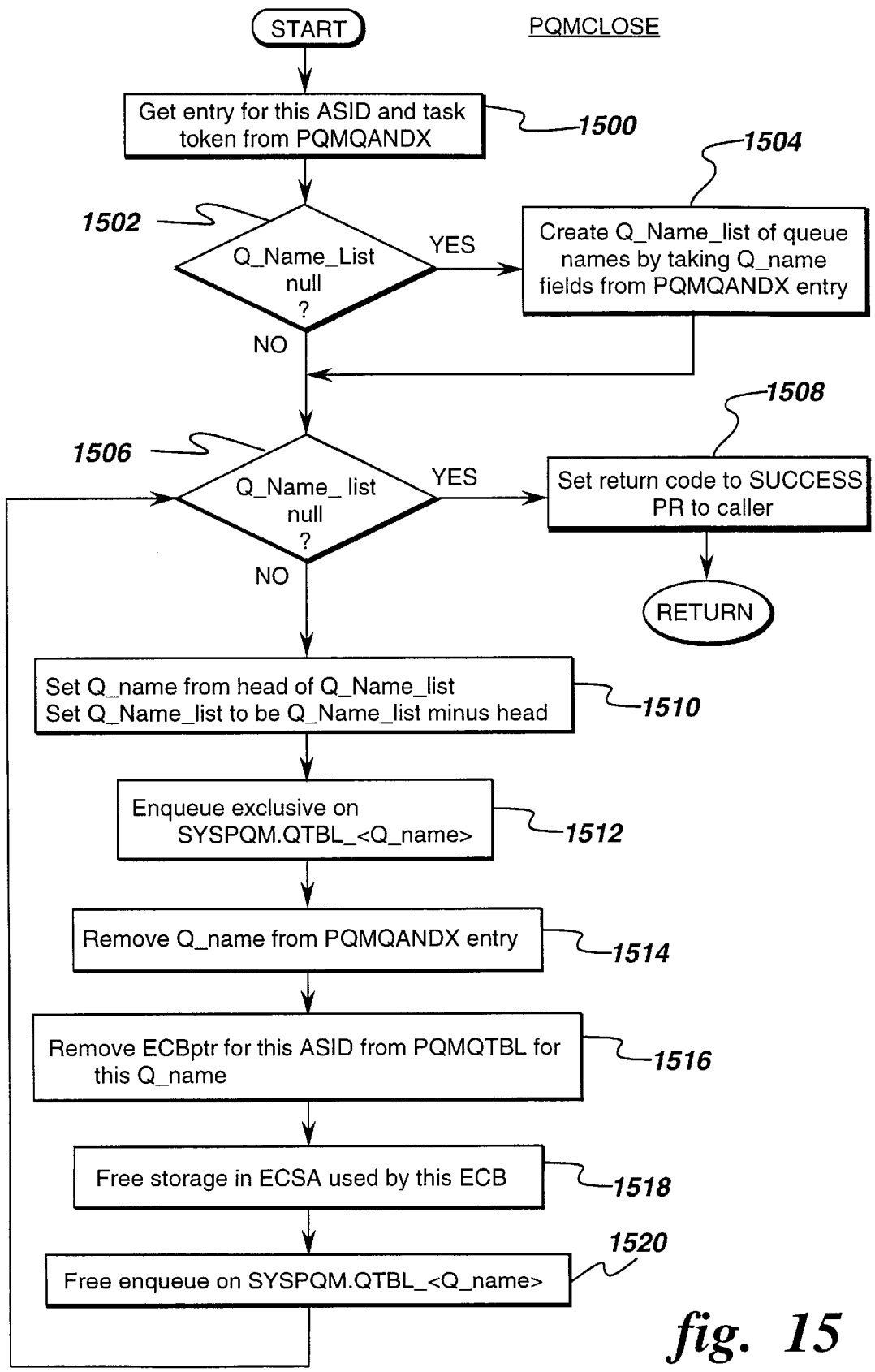
FIG. 15 depicts one embodiment of the logic associated with removing connection to a queue established by the logic of FIG. 14, in accordance with the principles of the present invention.

PQMCLOSE is used to remove interest in a particular queue for the calling task. When the user wishes to remove interest in a particular queue, a C library routine, pqmcls( ), is used to issue a Program Call to PQMCLOSE. In one example, pqmcls( ) includes a Q_Name_List parameter specifying a list of the queues in PQMQTBL to be closed. One example of the logic associated with PQMCLOSE is described in detail with reference to FIG. 15.

Initially, in one embodiment, the appropriate entry 304 (FIG. 3) of PQMQANDX 300 is obtained using the address space identifier and task token of the process issuing the PQMCLOSE, STEP 1500. Next, a determination is made as to whether the Q_Name_List parameter is null indicating that no queue name was specified, INQUIRY 1502. If it is null, then a list of queue names (Q_Name_List) is created from selecting the queue names from the PQMQANDX entry obtained in STEP 1500, STEP 1504.

Thereafter or if the Q_Name_List parameter is not null, a further check is made to see if the Q_Name_List is empty, INQUIRY 1506. Should the Q_Name_List be null, then a successful return code is passed to the user indicating that all the queues for the user's process are closed, STEP 1508.

However, if the Q_Name_List is not null, then the head of the Q_Name_List is popped, STEP 1510, and an exclusive enqueue is taken on SYSPQM.QTBL_<Q_name>, STEP 1512. Next, the queue name is removed from PQMQANDX, STEP 1514, and the ECBptr for this address space identifier is removed from PQMQTBL for this queue name, STEP 1516. Thereafter, the storage in ECSA for this ECB is freed, STEP 1518, the enqueue on SYSPQM.QTBL_<Q_name> is freed, STEP 1520, and processing continues with INQUIRY 1506.

In addition to opening and closing queues, the message processing facility of the present invention provides for the sending of messages to open queues. PQMSEND is used to place messages in queues so that processes can retrieve the messages using, for example, PQMRECV, and perform the tasks specified by the messages. In one example, PQMSEND is Program Called by a user's C library routine, pqmsend( ). Pqmsend( ) includes a number of parameters, such as Q_Name_List specifying one or more queue names to receive the message, a message_list specifying a list of messages, an association between messages and queue names and an option parameter that can have a number of different values. For example, the options include REPLYTO( ), which indicates a transaction is being initiated for a particular request and a nexus (a.k.a., a collection list) is needed. The argument to the REPLYTO( ) indicates the queue that should be sent the collected results when a particular transaction is complete. A message with the collected results is sent to the queue specified in the REPLYTO parameter. Another option includes <null> or * indicating no specific queue name is provided by the user; or REPLY indicating that the message is to be sent to the nexus as one of the results specifying an end of the limb's processing. One embodiment of the logic associated with PQMSEND is described in detail below with reference to FIGS. 16*a*–16*h*.

Initially, a determination is made as to whether a null is provided in the Q_Name_List, INQUIRY 1600. If null was specified, then no specific queue name was provided by the user, so a target-queue-name is obtained from the message-header of the message to be stored in the queue. In particular, the target-queue-name is retrieved from replyto sysid/queue field 614 of the message-header, STEP 1602. The extracted queue name is then stored in the Q_Name_List parameter of the PQMSEND, STEP 1603. Further, in one embodiment, if a null queue name is provided, then it is assumed that the end of a limb has been reached, therefore, the REPLY option is added to the option list, STEP 1604.

Next, a check of the queue name is made to determine if it is valid, INQUIRY 1606. If the queue name is invalid (e.g., null), then a return code is set to TARGET_NOT_FOUND, STEP 1608, and a Program Return is issued with the return code, STEP 1610. If the target-queue-name is valid, then processing continues with STEP 1620, which is described in detail below.

Returning to INQUIRY 1600, if a specific Q_Name_List is provided, then a further check is made to determine if a message header has already been created for the message to be stored in the queue(s), INQUIRY 1612. In one embodiment, if the message header has not been created this signifies that a new request is being generated and this is the first message for the request. Thus, if the message header does not exist (from a prior received message), INQUIRY 1612, then storage is allocated for the message header, STEP 1614. Additionally, a new request id is generated for the new request, STEP 1616. In particular, in one example, exclusive access is obtained on request-counter field 212 of PQMVT 200 by, for instance, a COMPARE DOUBLE and SWAP operation or via an enqueue on a resource name, as described above, and the request-counter is incremented by one. Thereafter, the lock is released and the new request counter is stored in req-id field 608 of MESSAGE 600, STEP 1618. Since this is a new message header, the other fields of the message header are filled in during the message processing of the present invention, as described herein.

Figure 17:
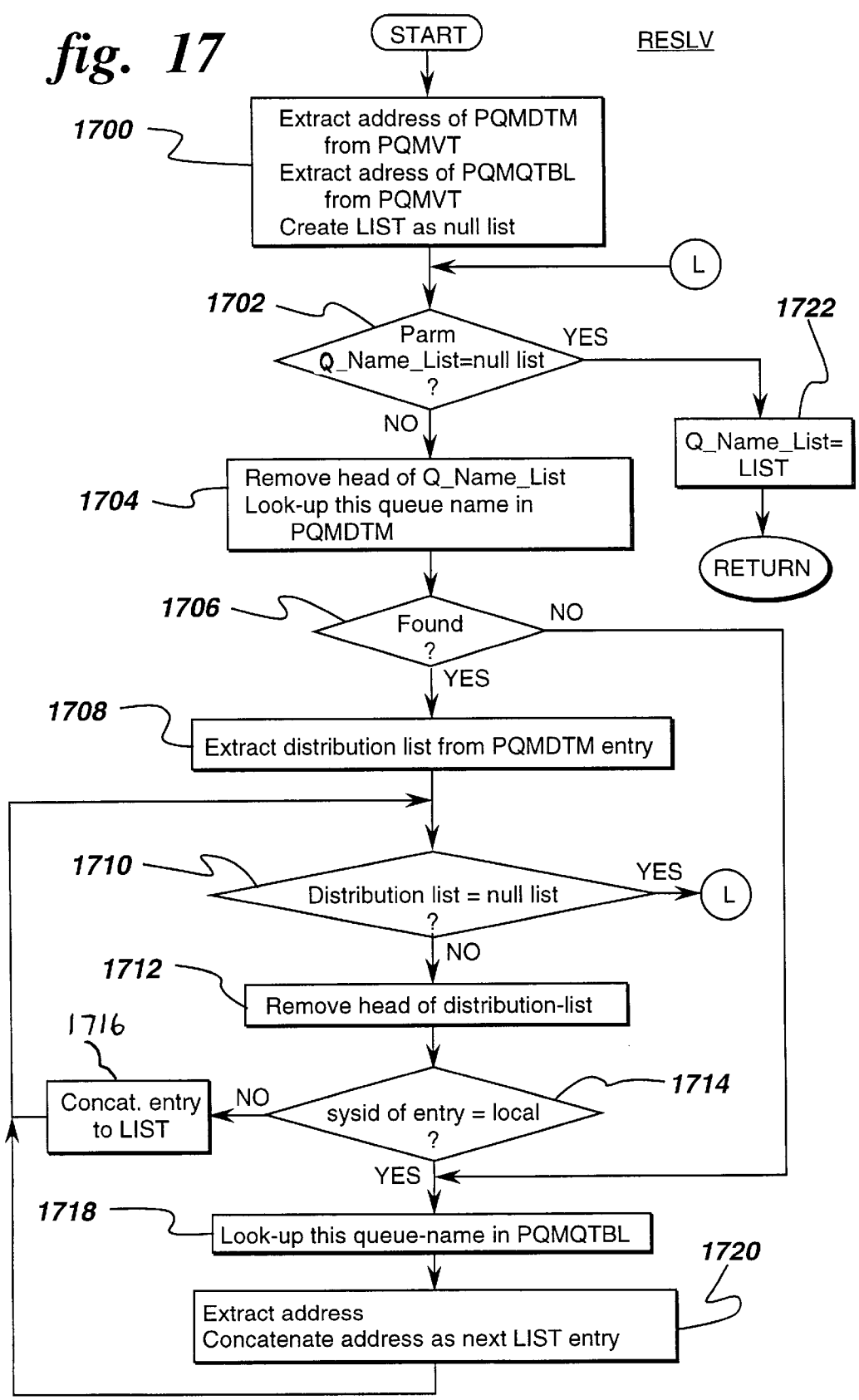
FIG. 17 depicts one example of the logic associated with resolving a list of queue names to a list of system identifiers and address pairs, in accordance with the principles of the present invention.

Subsequent to creating the message header or if the header previously existed, the Q_Name_List parameter is resolved to a list of system ids and queue names or local queue addresses, STEP 1620. In one example, the Q_Name_List includes names of one or more distribution lists in PQMDTM having one or more queue names, or one or more queue names from PQMQTBL or any combination of the two, and thus, this list is broken down (i.e., resolved) into a simple list of queues, including the system (sysid) and address of each queue. A RESLV routine is used for this task and includes as parameters the Q_Name_List and a buffer_ptr indicating an address of storage for the result of the resolve process. One embodiment for performing this resolve is described in detail below with reference to FIG. 17.

In one embodiment, the addresses of PQMDTM and PQMQTBL are extracted from PQMVT 200, and a list to contain the queue sysids and addresses (i.e., LIST) is created and initialized to null, STEP 1700.

Subsequent to initializing req-id 608 and LIST, a check is made to determine if the Q_Name_List passed as a parameter from PQMSEND is null, INQUIRY 1702. If the list is null, then the process is ended, since there is nothing to resolve, STEP 1703. However, if the Q_Name_List is not null, the head of the Q_Name List is removed and this queue name is searched for in PQMDTM, STEP 1704. If the queue name is found in PQMDTM indicating that the queue name represents a distribution list, INQUIRY 1706, then the distribution list corresponding to that name is extracted from the local PQMDTM, STEP 1708.

Thereafter, a determination is made as to whether the distribution list is null, INQUIRY 1710. If it is null, then processing returns to INQUIRY 1702. However, if it is not null, then the head of the distribution list is removed, STEP 1712, and a check is made to see whether the queue at the head of the distribution list is local, INQUIRY 1714.

Should the queue be on a remote system, then the extracted head entry is concatenated to LIST, STEP 1716, and processing continues with INQUIRY 1710. On the other hand, if the queue represented by the head of the entry is local, the name associated with the queue is located in PQMQTBL, STEP 1718. The address of that queue is extracted from the entries in PQMQTBL and is concatenated as the next LIST entry, STEP 1720. Thereafter, processing continues with INQUIRY 1710. Once all of the queue names on the Q_Name_List have been resolved creating the list (LIST) of queue addresses, the resolve process is complete, and Q_Name_List is set equal to the LIST from the resolve processing, STEP 1722.

Returning to FIG. 16*a*, subsequent to performing the resolve, the message header is copied to a local variable referred to as M_HDR. M_HDR provides a copy of the received message header or the header just created. M_HDR is used to initialize message headers for each of the multiple messages PQMSEND will queue for this call, STEP 1624. In one embodiment, M_HDR includes all of the same fields as message header 620.

Figure 16A:
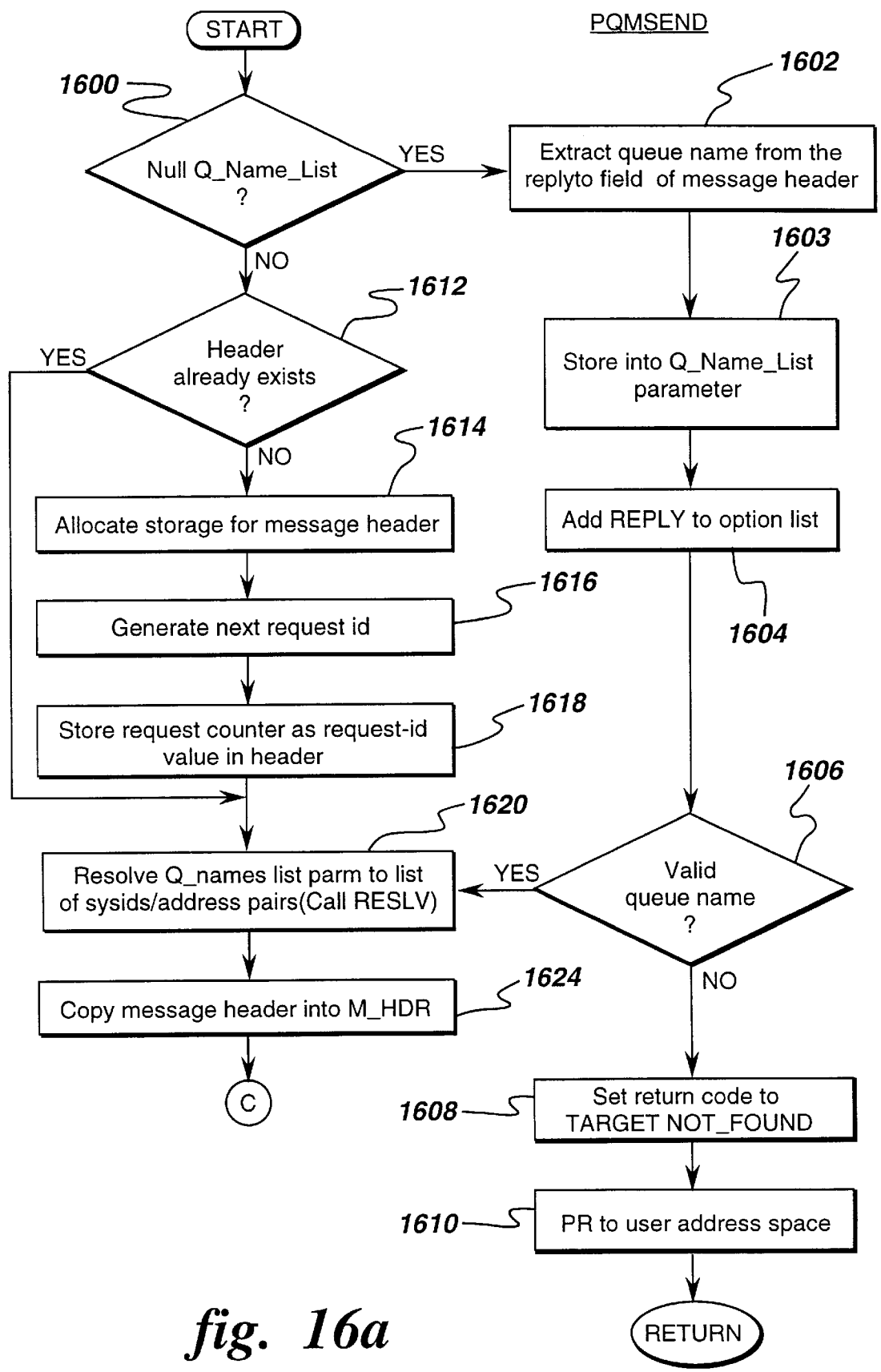
FIGS. 16a–16h depict one embodiment of the logic associated with sending a message to a queue opened by the logic of FIG. 14, in accordance with the principles of the present invention.
Figure 16B:
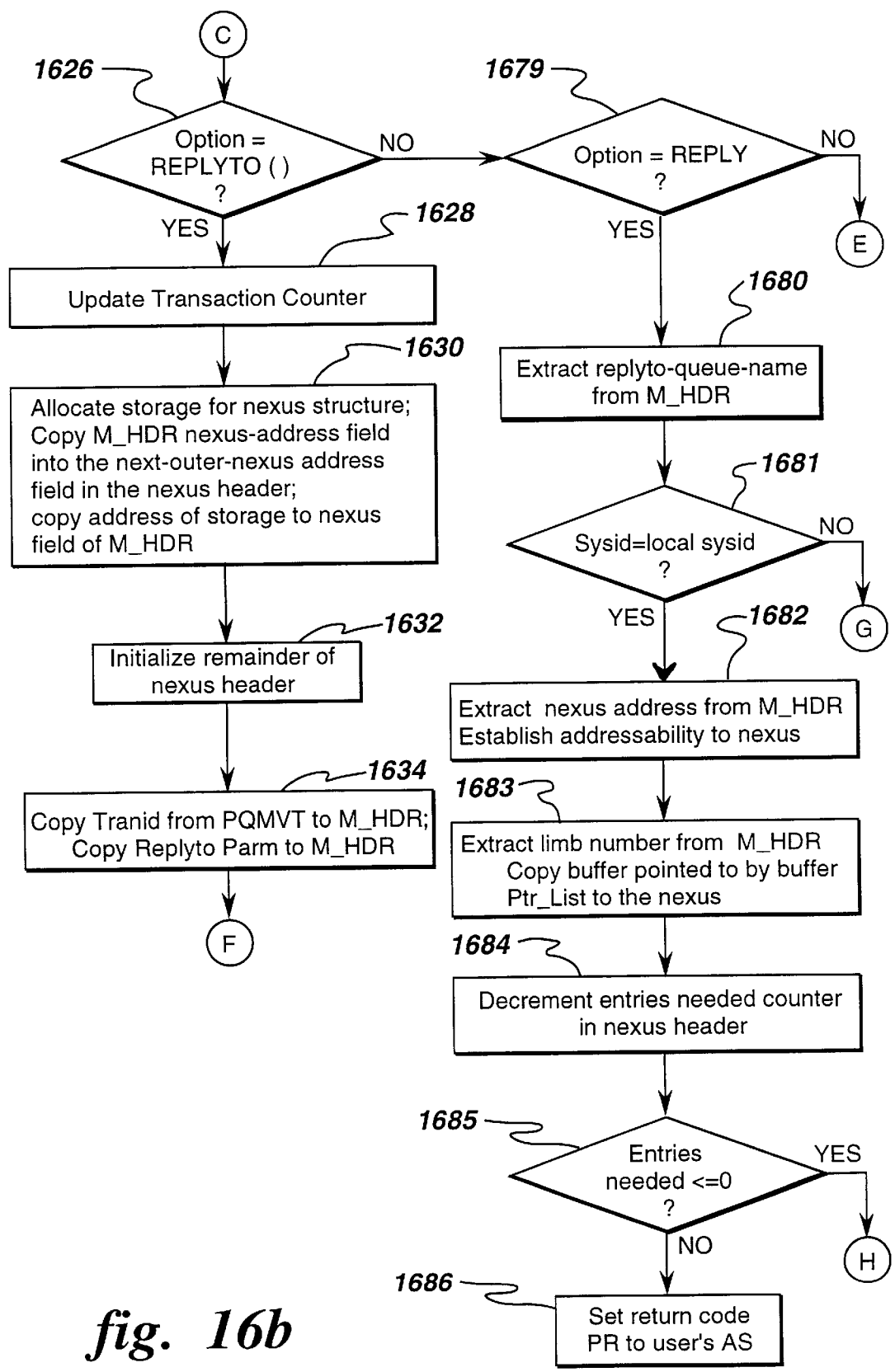
Figure 16C:
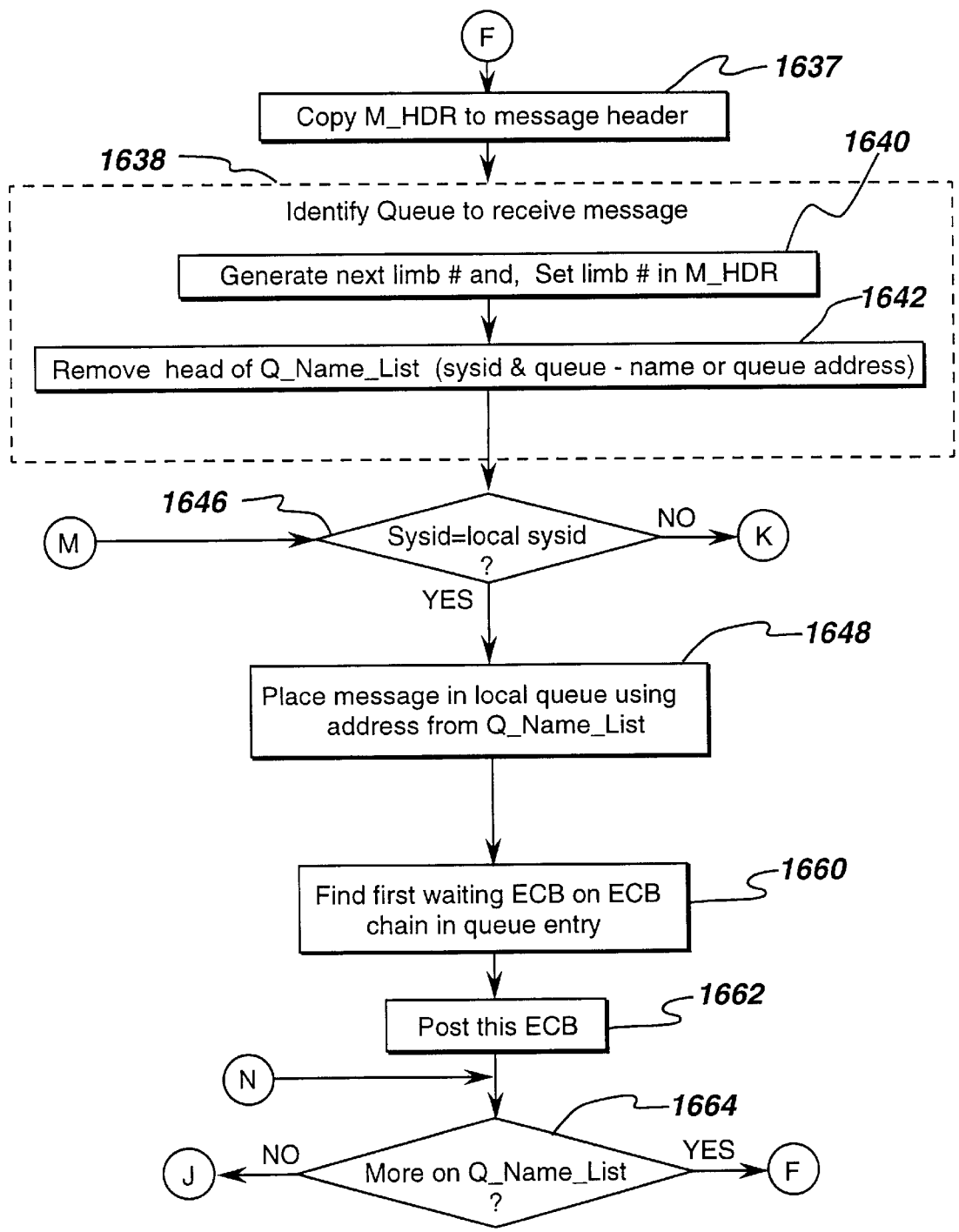

Next, a determination is made as to which option is specified on the options parameter of the PQMSEND, INQUIRY 1626 (FIG. 16*b*). If the REPLYTO( ) option is specified, then a transaction is being initialized and a nexus structure is set up for the new transaction. A unique transaction identifier is assigned, STEP 1628. This transaction identifier is placed in tran-id field 606 of the message header. Specifically, as one example, exclusive access of transaction-counter 210 of PQMVT 200 is obtained in order to increment the transaction-counter. The transaction-counter is incremented by one and then the exclusive lock is released.

Thereafter, storage for the nexus structure to be associated with this new transaction is allocated on the system executing the PQMSEND. Then, the address of the nexus in the message header is placed in the next-outer-nexus-address field of the nexus header. The address of this nexus is copied to nexus address field 616 of the local message header (M_HDR), STEP 1630.

Next, the remainder of the header of the newly allocated nexus is filled in, as indicated herein, STEP 1632. For example, tran-id 606 of M_HDR is copied to next-outer-tran-id 712 of nexus 700, limb #610 is copied to next-outer-limb number 716, the queue specified on the REPLYTO( ) parameter is copied to queue name for collected results 718, and the count of the Q_Name_List is copied to entries needed to complete field 710. The replyto sysid/queue field 614 of the M_HDR is copied to the next-outer-queue name field 714.

In addition to the above, transaction-counter 210 of PQMVT 200 is copied to tran-id 606 of M_HDR and the queue specified on the REPLYTO( ) parameter is copied to replyto sysid/queue field 614 of the M_HDR, STEP 1634. If a send to multiple targets (Q_name_list has more than one element) is processed as the result of a received message that is not associated with a nexus, a new nexus is created. The first message sent will have limb number one in its header. Subsequent limb-numbers for the remaining messages will be assigned sequentially. The number of limbs field of the nexus header will be set to the number of limbs used by this PQMSEND call, STEP 1636.

Subsequent to setting up the nexus header and local message header for the new transaction, the process for sending the message to the queue takes place. In one example, before the message can be sent, however, M_HDR is copied to the message header, STEP 1637, and the queue to receive the message is identified, STEP 1638. In one example, in order to identify the position of the message in the parallel transaction, a limb number is placed in the message header copy, M_HDR, indicating the current limb being worked on, STEP 1640. Next, the head of Q_Name_List is removed, STEP 1642.

Thereafter, a determination is made as to whether the queue is on the local system that issued PQMSEND or whether it is on a remote system, INQUIRY 1646. If the queue is local, then the message is placed by the queue manager of the local system on the local queue, STEP 1648. In one embodiment, if there are multiple messages indicated by the parms to PQMSEND, then the appropriate message is selected based on the association between the messages and queues provided.

After placing the message in the queue, a determination is made as to whether this is the first message placed in the queue, INQUIRY 1658. After the message is queued, the ECBptrs listed in the PQMQTBL entry for this queue are searched for the first waiting ECB, STEP 1660. In one example, an ECB is determined as waiting by checking a wait bit located within the ECB. Once the first waiting ECB is located, it is posted to signal the process to retrieve the message from the queue, as described in PQMRECV processing.

Figure 16D:
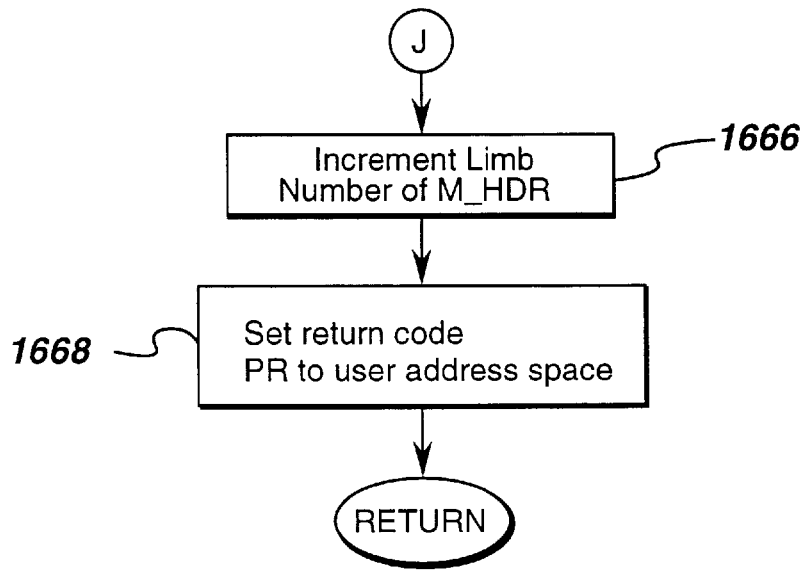

Once the ECB is posted or if this is not the first message in the queue, INQUIRY 1658, then a check is made to see if other queues are to receive this message, INQUIRY 1664. In particular, if additional queues are specified on the resolved Q_Name_List, then the flow returns to STEP 1637 and continues, as described above. If, however, there are no more queues to receive the message, then limb # 610 of M_HDR is incremented by one, such that the next pqmsend( ) will properly number the next limb, STEP 1666 (FIG. 16*d*). Thereafter, a successful return code is sent and a Program Return to the user's address space is issued, STEP 1668.

Figure 16E:
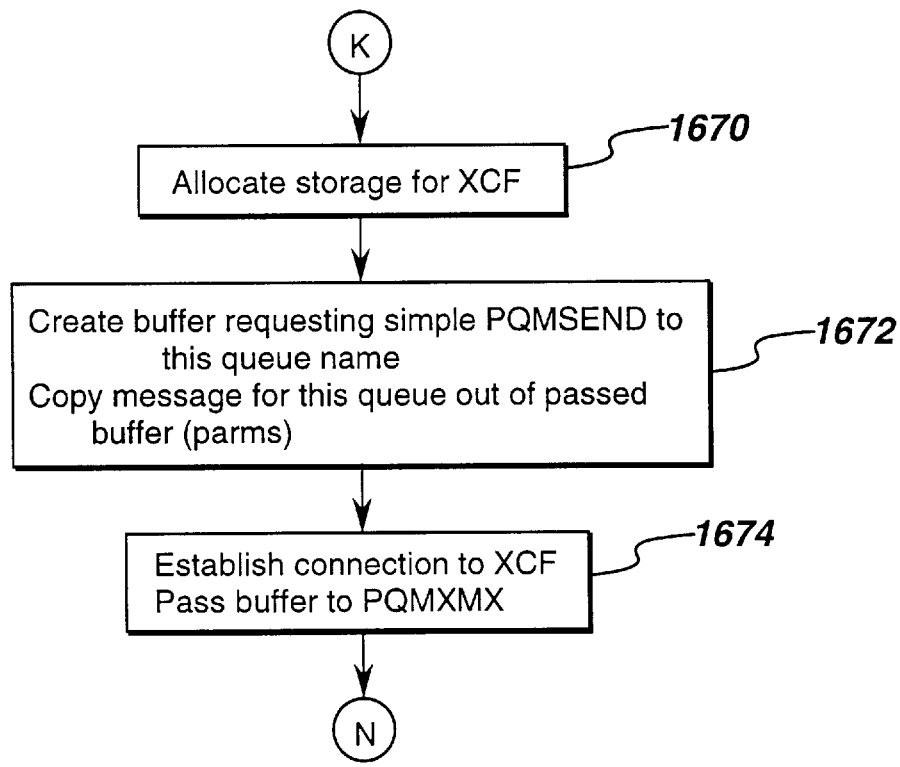

Returning to INQUIRY 1646 (FIG. 16*c*), if, however, the queue is not on the local system, then the message needs to be sent to the queue manager on the remote system to place the message in the queue. In order to accomplish this, in one example, initially, storage is allocated for use by XCF in transferring the message to the remote system, STEP 1670 (FIG. 16*e*). A buffer requesting a simple PQMSEND sending the message to the identified queue is created and the message is copied from the buffer identified by buffer_ptr list to the newly created buffer. Thereafter, via the use of the IXCMSGO macro, the buffer carrying the message is sent to PQMXMX (a XCF exit) for calling of PQMSEND on the identified system, STEP 1674. (IXCMSGO is described in detail in "MVS/ESA: Programming: Sysplex Services Reference MVS/ESA System Product: JES2 Version 5 JES3 Version 5," IBM Publication Number GC28-1496-02, June 1995, which is hereby incorporated herein by reference in its entirety.) In one example, PQMXMX allocates storage on the remote system for the message and then the message is copied from XCF and placed in the storage. Thereafter, PQMSEND is called via pqmsend( ) and buffer_ptr list is set to the address of the allocated storage. After sending the message to the remote system, processing of PQMSEND then continues, INQUIRY 1664.

Returning to INQUIRY 1626 (FIG. 16*b*), if the specified option on PQMSEND is REPLY, INQUIRY 1679, indicating that a transaction has already been started and that this is completing processing for this limb of the transaction, then the name of the target queue to receive the message is extracted from replyto sysid/queue field 614 of M_HDR, STEP 1680. Next, a determination is made in the manner described above as to whether the extracted target queue is on the local system or a remote system, INQUIRY 1681.

If the target queue is on the local system, then the address of the nexus for this transaction is retrieved from the nexus address field of M_HDR thus, enabling the nexus to be located, STEP 1682. Next, the limb # is extracted from M_HDR and the contents of the message are copied to the nexus entry (or slot) corresponding to the extracted limb #, STEP 1683. For example, if the limb # is 5, then the message is placed as the fifth entry of the nexus. Thereafter, entries needed to complete field 710 of nexus header 702 is decremented by one, STEP 1684.

When the entries needed to complete field is greater than zero indicating that more messages are to be collected and placed in the nexus before being sent to the target queue, INQUIRY 1685, then a Program Return to the user's address space takes place, STEP 1686. However, if all of the entries have been filled in the nexus structure, INQUIRY 1685, then the messages are collected and sent to the target queue as one long message, as described in detail below.

Figure 16F:
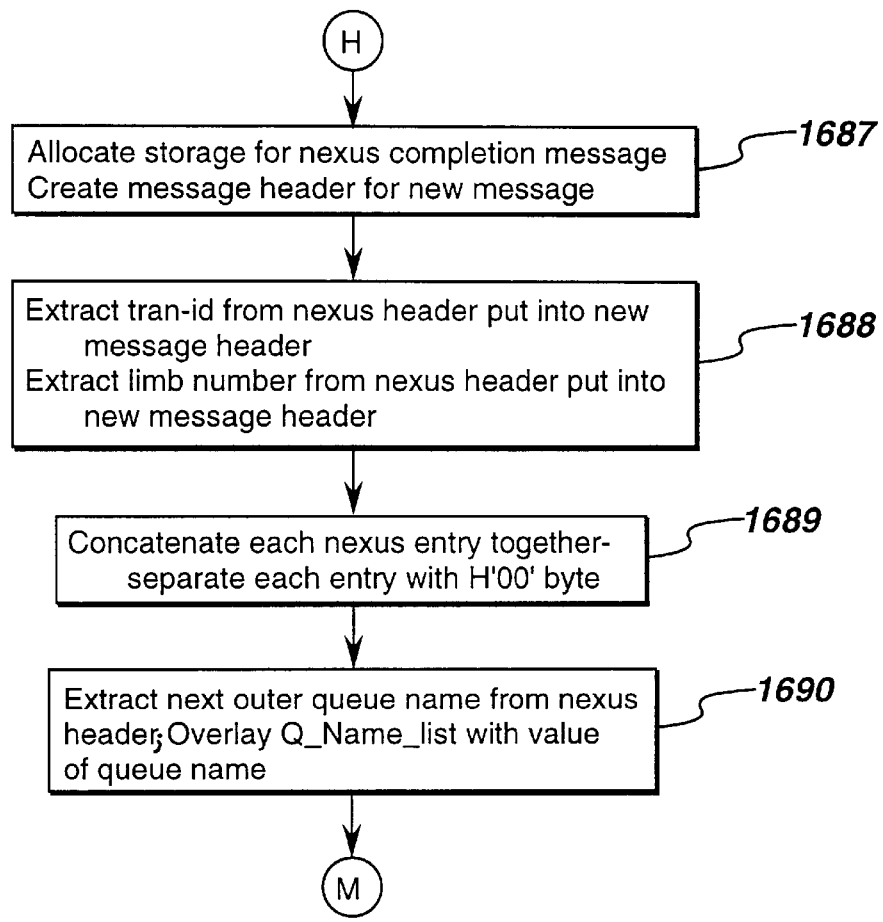

Initially, storage is allocated for a completion message to be sent to the queue identified in the next-outer-queue-name field of the nexus header 714 and a message header is created for the new completion message, STEP 1687 (FIG. 16*f*). In one embodiment, this message header has the same fields as the message header of message 600. Once the message header is created, next-outer-tran-id 712 is copied from nexus header 702 and placed into the tran-id field of the new message header, and next-outer-limb number field 716 is copied to the limb # field of the new message header, STEP 1688. The next-outer-queue name 714 of the nexus header is copied into the replyto sysid/queue name field 614 of the messae header. Also, the next-outer nexus address field 715 of the nexus header is copied into nexus address field 616 of the message header. The entries of the nexus are concatenated together creating one large completion message, STEP 1689.

Subsequently, the next outer queue name field in the nexus header is extracted and the value in that field overlays the queue names specified on the Q_Name_List parameter of the PQMSEND ensuring that the completion message is sent to the queue specified by the next outer queue name, STEP 1690. Processing then continues, as described above, with STEP 1646.

Figure 16H:
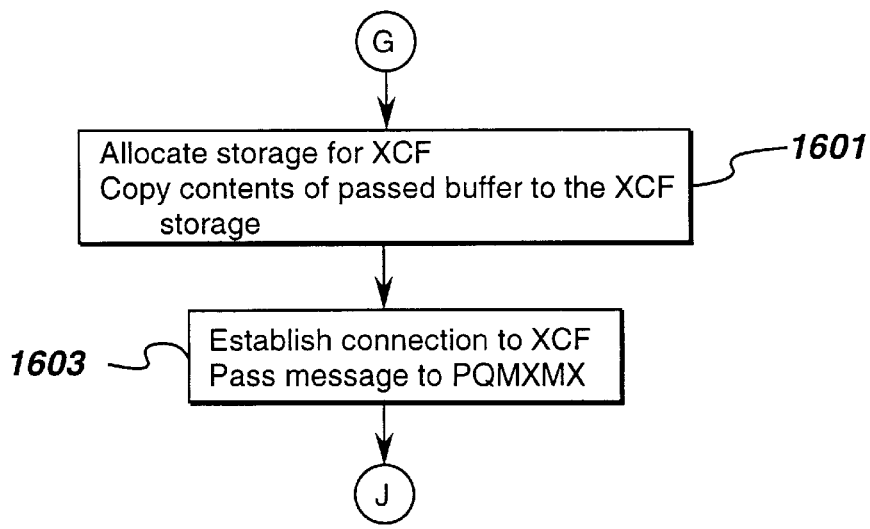
Figure 16G:
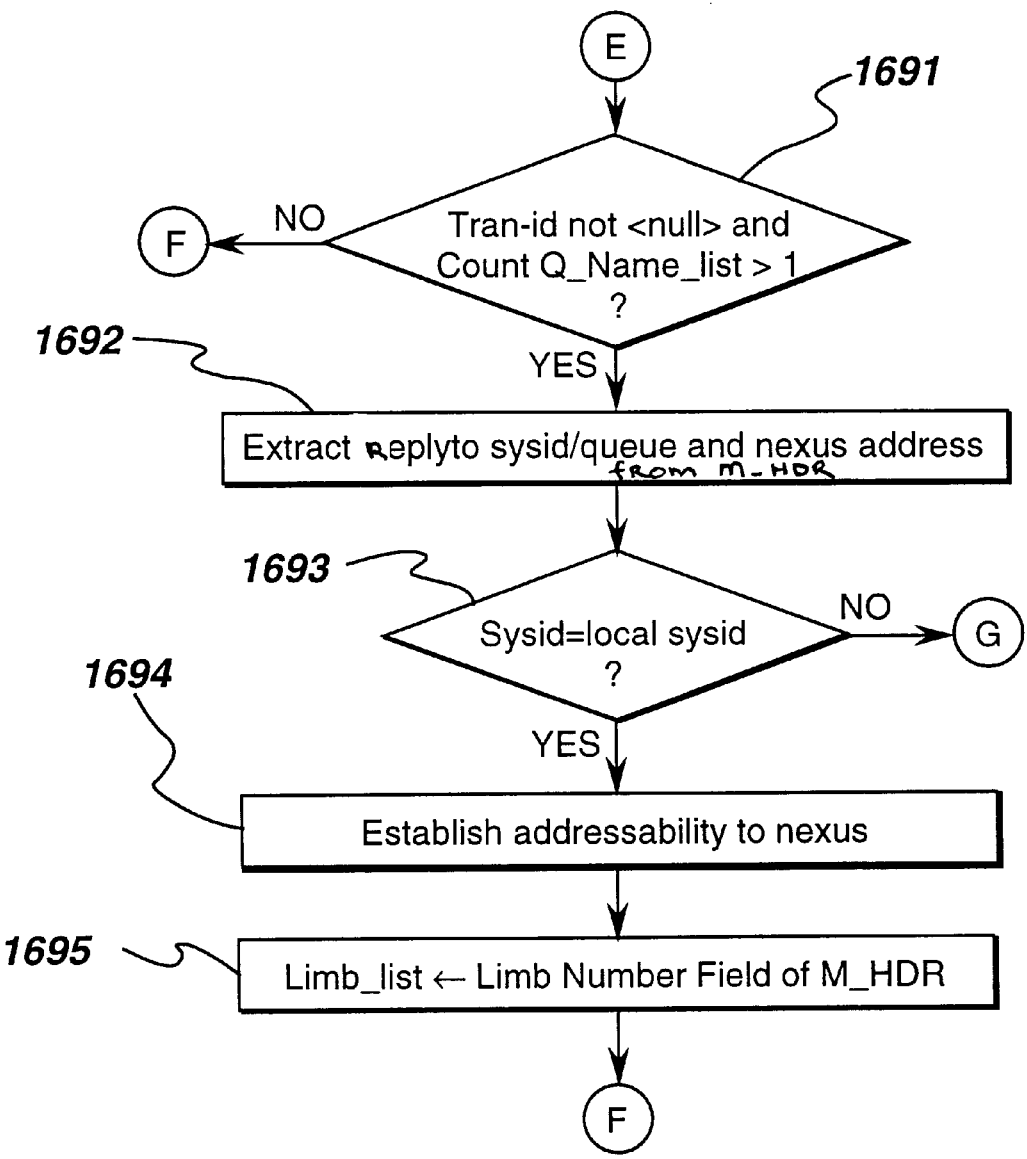

Returning to INQUIRY 1679 (FIG. 16*b*), if the option specified on PQMSEND is not REPLYTO( ) or REPLY, then flow passes to INQUIRY 1691 (FIG. 16*g*). At this inquiry, a determination is made as to whether more than a simple send is occurring (i.e., more than 1 message). If the transaction identifier from M_HDR is null and the count of the Q_Name_List is less than or equal to one, then there is a simple send and flow continues with STEP 1637, in which the queue to receive the message is identified. However, if the transaction id is not null or the count of the Q_Name_List is greater than one, indicating a fan-out, then the replyto sysid/queue 614 and the nexus address for this transaction are extracted from M_HDR, STEP 1692.

Should the replyto sysid/queue be on the local system, INQUIRY 1693, then addressability to the nexus is established (using the nexus address extracted from M_HDR) and the value of number of limbs is extracted from the M_HDR, STEP 1695. If this is a send to a single target or the first target of a send for a list, the limb number is the limb number of the received message. If this is the second target of the Q_name_list, then the number of limbs field 708 is incremented and copied into the limb-number field of M_HDR. For each subsequent target, the M_HDR limb-number field is incremented.

Subsequently, processing continues with STEP 1637 "IDENTIFY QUEUE TO RECEIVE MESSAGE," described above.

Returning to INQUIRY 1693, if the queue is not local to the system, then processing continues with STEP 1601 (FIG. 16*h*).

Returning to INQUIRY 1681 (FIG. 16*b*), if the specified option is REPLY and the queue identified by the replyto sysid/queue field of the message is not on the local system, then processing continues with STEP 1601 (FIG. 16*h*), as described above.

Figure 18:
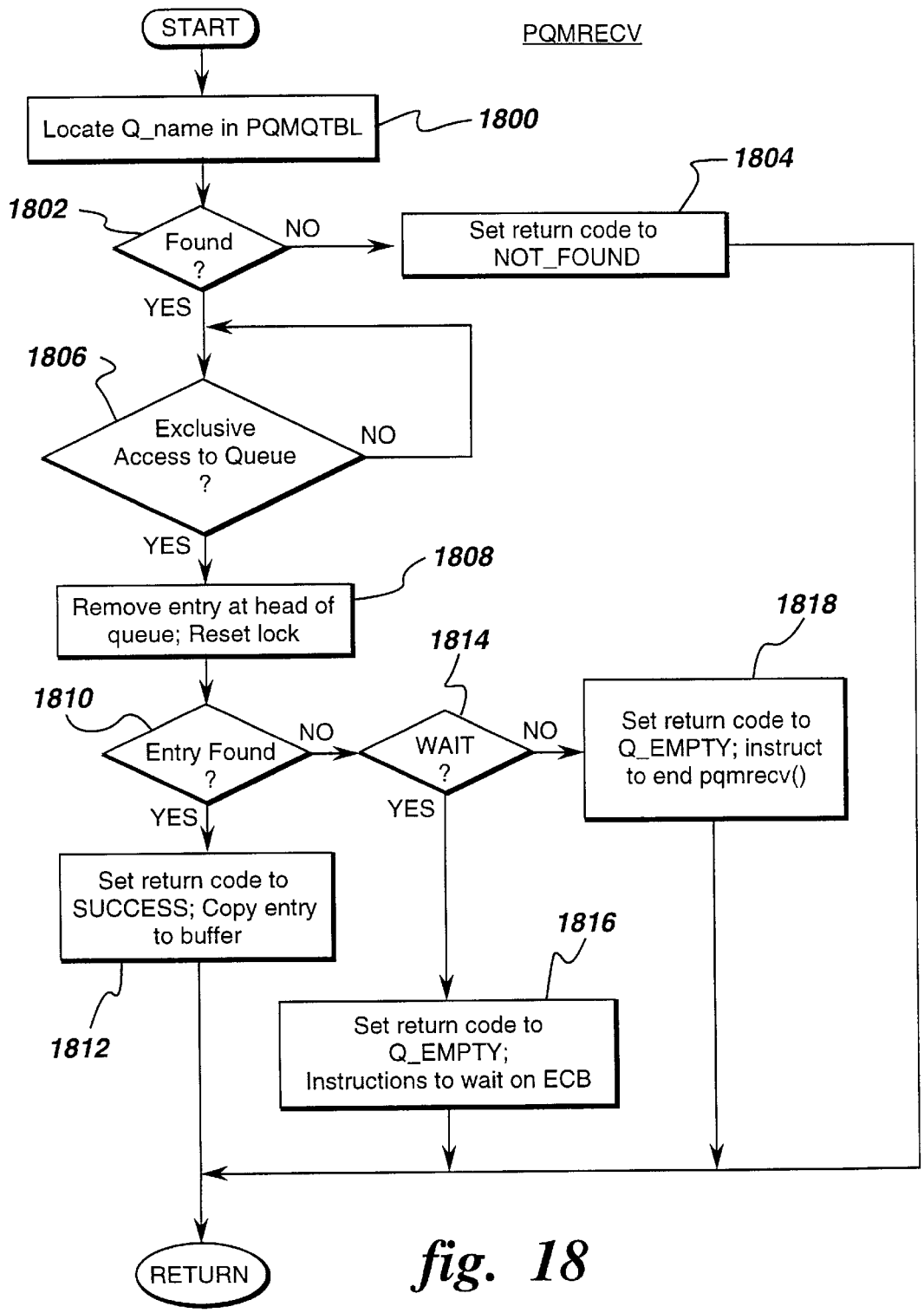
FIG. 18 depicts one embodiment of the logic associated with receiving messages placed in a queue by the logic of FIGS. 16a–16h, in accordance with the principles of the present invention.

PQMRECV is used by a user process to retrieve messages stored in a queue. Once again, it is initiated, in one example, by a Program Call instruction located within the user process. The parameters for the PQMRECV Program Call include, for instance, the Q_NAME indicating the queue to be read, a BUFFER_PTR indicating an address of storage in the user's private area, and a NOWAIT/WAIT option indicating whether or not the process is to wait if there is nothing in the queue. The default in this embodiment is WAIT, indicating that the process will wait for messages to be sent to the queue and will not perform other work (such as, for instance, checking other queues). One embodiment of the logic associated with PQMRECV is described in detail with reference to FIG. 18.

Initially, the Q_NAME provided as a parameter to the Program Call is searched in PQMTBL 500, STEP 1800. If it is not found, INQUIRY 1802, then the return code is set to NOT_FOUND and a Program Return to the caller is issued, STEP 1804. However, if the requested Q_NAME is located in the queue table, PQMQTBL then an attempt to obtain exclusive access on the queue is performed, INQUIRY 1806. In one instance, exclusive access can be performed by using a COMPARE DOUBLE and SWAP (CDS) instruction on the queue pointers. Should exclusive access be denied, then it is attempted again, INQUIRY 1806.

However, if exclusive access is obtained, then the entry at the head of the queue is removed and the exclusive lock is reset, STEP 1808.

(One embodiment of the COMPARE DOUBLE and SWAP instruction, Program Call instruction and Program Return instruction are described in detail in "Enterprise Systems Architecture/390 Principles of Operation," IBM Publication Number SA22-7201-02, (December 1994), which is hereby incorporated herein by reference in its entirety.)

If the removal of the queue entry is successful, INQUIRY 1810, then the return code is set to SUCCESS and the entry is copied to the buffer designated by BUFFER_PTR, STEP 1812. If, however, the removal is unsuccessful indicating that no entry was found, INQUIRY 1810, then a determination is made as to whether the process should wait for an ECB to be posted to the queue. Should the WAIT option be specified as a parameter, INQUIRY 1814, then the return code is set to Q_EMPTY and instructions are issued to wait on an ECB, STEP 1816. On the other hand, if the option specified is NOWAIT, INQUIRY 1814, then the return code is set to Q_EMPTY and instructions are issued to end the PQMRECV routine, STEP 1818.

Described above is a message processing facility that adds capabilities to a sending function, such as the ability to choose a default target for a message, initiate parallel execution, add additional processes to an already parallel execution and determine that a request has completed and perform the appropriate completion actions.

When the SEND initiates a new parallel execution, it creates a collection point for the results. This collection point is called a "nexus." The nexus is created to hold the results for this unique transaction and creates a unique transaction identifier. The very first transactions or the outermost transactions are called requests. Each request has a unique request identifier. In addition, as it sends out messages to each process in the parallel execution, it creates a unique identifier for the chain or limb of the execution. This triplet of identifiers is carried by all of the messages for this request and uniquely identifies the position of a message in the topology of requests, the transactions within the request, the limbs within the transactions and the possible subtransactions on the limbs. Each process that receives this originating message may then pass the message on to another process or to several processes (this latter option is called "fanning out"). The topology triplet in the received message header is used as a template for the messages the process will send out. If the process adds limbs to the transaction, or starts a new subtransaction, the triplets are updated appropriately and sent out in the message headers of the messages sent. Whenever a fan-out occurs, the send function uniquely identifies each message or copy of a message in the fan-out. The process that processes that message begins what is called a "limb." The process may then pass the processed message on to another process and so on. A simple limb includes all of this "chain" of processes. When the send function does a multicast and creates new limbs, each new limb gets a (unique) limb identifier to carry in the message from each limb. The send function uses the information in the nexus header to determine the next unique limb number for the transaction. Added send functions also make sure the nexus associated with the request has a list with sufficient entries to store the results from each limb in the current network of processes for this problem. In other words, the length of the list in the nexus is equal to the width of the parallelism in the network of tasks. This width or maximum limb number is carried in the control information in the nexus and is used to determine completion. A limb may execute another multicast, effectively widening the parallelism and adding limbs to the topology of the network of processes for this transaction. Added send function detects this widening, provides unique limb numbers for the new limbs and adds entries to the nexus list.

When the execution of a limb is complete, as indicated by a null target parameter or specifically indicated, the result is placed in the nexus list in the slot corresponding to its limb identifier. When all the slots are filled (i.e., all of the limb identifiers have been accounted for in arriving results), then the transaction is complete. When all transactions are complete, then the request is complete. Added send functions check to see if the list is complete when it puts each result in the list. When it is complete, the send function creates a message header that restores the value of the topology triplet to before this transaction or subtransaction was started. An added function to send gathers the list of results into one message and places it in the predetermined target queue. This target was supplied in the required initiation subparameter at the initiation of the request.

The above functions can be used recursively. In other words, a new request and its corresponding nexus can be initiated by any request on a limb. The collected results for this 'subproblem' then become one of the results of the next outermost problem.

A feature of this invention is the ability to coordinate the results of a network that has been widened in its parallelism without creating subproblems. The capacity of the send function to add more limbs and to added additional expected results from these limbs is advantageous.

The mechanisms of the present invention can be included in one or more computer program products including computer useable media, in which the media include computer readable program code means for providing and facilitating the mechanisms of the present invention. The products can be included as part of a computer system or sold separately.

The flow diagrams depicted herein are just exemplary. There may be many variations to these diagrams or the steps described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for processing messages in a computer system, comprising:

sending a message to a location designated to receive said message, said message comprising a request identifier specifying a request said message corresponds to and a sequence identifier indicating a position of said message in a dynamic processing sequence of said request, said position being relative to any other messages of said request, wherein said sending said message to said location comprises using a send function to send said message to said location, said send function including a parameter indicating that said request is a new request, and wherein said parameter further comprises a target parameter to receive results for said new request when processing for said new request is completed;

retrieving, by a process, said message from said location; and sending, by said process, said message to any one or more other processes dynamically chosen from among a plurality of processes, by said process, to receive said message.

2. The method of claim 1, wherein said retrieving comprises:

removing said request identifier and said sequence identifier prior to retrieval of said message.

3. The method of claim 1, further comprising determining completion of said dynamic processing sequence.

4. A system for processing messages in a computer system, comprising:

means for sending a message to a location designated to receive said message, said message comprising a request identifier specifying a request said message corresponds to and a sequence identifier indicating a position of said message in a dynamic processing sequence of said request, said position being relative to any other messages of said request, wherein said means for sending said message to said location comprises a send function to send said message to said location, said send function including a parameter indicating that said request is a new request, and wherein said parameter further comprises a target parameter to receive results for said new request when processing for said new request is completed;

means for retrieving, by a process, said message from said location; and means for sending, by said process, said message to any one or more other processes dynamically chosen from among a plurality of processes, by said process, to receive said message.

5. The system of claim 4, wherein said means for retrieving comprises:

means for removing said request identifier and said sequence identifier prior to retrieval of said message.

6. The system of claim 4, further comprising means for determining completion of said dynamic processing sequence.

7. An article of manufacture, comprising:

at least one computer usable medium having computer readable program code means embodied therein for causing messages to be processed in a computer system, the computer readable program code means in said article of manufacture comprising:

(a) computer readable program code means for causing a computer to send a message to a location designated to receive said message, said message comprising a request identifier specifying a request said message corresponds to and a sequence identifier indicating a position of said message in a dynamic processing sequence of said request, said position being relative to any other messages of said request, wherein said computer readable program code means for causing a computer to send said message to said location comprises computer readable program code means for causing a computer to effect a send function to send said message to said location, said send function including a parameter indicating that said request is a new request, and wherein said parameter further comprises a target parameter to receive results for said new request when processing for said new request is completed;

(b) computer readable program code means for causing a computer to retrieve, by a process, said message from said location; and (c) computer readable program code means for causing a computer to send, by said process, said message to any one or more other processes dynamically chosen from among a plurality of processes, by said process, to receive said message.

8. The article of manufacture of claim 7, wherein said computer readable program code means for causing a computer to retrieve comprises computer readable program code means for causing a computer to remove said request identifier and said sequence identifier prior to retrieval of said message.

9. The article of manufacture of claim 7, further comprising computer readable program code means for causing a computer to determine completion of said dynamic processing sequence.

* * * * *